(12) United States Patent
Park et al.

(10) Patent No.: US 10,137,833 B2
(45) Date of Patent: Nov. 27, 2018

(54) VEHICLE CONTROL APPARATUS, VEHICLE DRIVING ASSISTANCE APPARATUS, MOBILE TERMINAL AND CONTROL METHOD THEREOF

(71) Applicant: LG ELECTRONICS INC., Seoul (KR)

(72) Inventors: Jongseok Park, Seoul (KR); Taehoon Cho, Seoul (KR); Yunmi Kwon, Seoul (KR); Kiseon Lee, Seoul (KR); Jie Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 15/125,310

(22) PCT Filed: Mar. 19, 2015

(86) PCT No.: PCT/KR2015/002697
§ 371 (c)(1),
(2) Date: Sep. 12, 2016

(87) PCT Pub. No.: WO2016/140391
PCT Pub. Date: Sep. 9, 2016

(65) Prior Publication Data
US 2018/0079359 A1  Mar. 22, 2018

(30) Foreign Application Priority Data
Mar. 3, 2015 (KR) .................. 10-2015-0029996

(51) Int. Cl.
*B60Q 1/00* (2006.01)
*B60Q 9/00* (2006.01)
(Continued)

(52) U.S. Cl.
CPC .............. *B60Q 9/008* (2013.01); *B60W 50/14* (2013.01); *G01S 13/931* (2013.01);
(Continued)

(58) Field of Classification Search
CPC ........ G08G 1/16–1/167; G08G 1/0967; G08G 1/096775; G08G 1/096783;
(Continued)

(56) References Cited

U.S. PATENT DOCUMENTS 5,659,304 A  *  8/1997  Chakraborty ...... B60K 31/0008
                                              180/167
2006/0250297 A1 * 11/2006 Prakah-Asante ... B60R 21/0134
                                              342/70
(Continued)

FOREIGN PATENT DOCUMENTS

JP        4774849 B2      9/2011
KR     10-2013-0009119 A  1/2013
(Continued)

OTHER PUBLICATIONS

Machine translation of foreign reference KR 10-2013-0009119 A.*
Machine translation of foreign reference KR 2013-113088 A.*

*Primary Examiner* — Thomas Mullen
(74) *Attorney, Agent, or Firm* — Birch, Stewart, Kolasch & Birch, LLP

(57) ABSTRACT

A mobile terminal including an output unit; a wireless communication unit configured to receive at least one of object information associated with an object located adjacent to a vehicle and driving information associated with the driving of the vehicle from one or more external devices; and a controller configured to detect a collision possibility between the object and the vehicle based on the driving information and the object information, and control the output unit to output notification information for notifying (Continued)

the collision possibility in response to the collision possibility being detected between the vehicle and the object.

15 Claims, 33 Drawing Sheets

(51) Int. Cl.
    *G08G 1/16*     (2006.01)
    *G08G 1/0967*     (2006.01)
    *G01S 13/93*     (2006.01)
    *B60W 50/14*     (2012.01)

(52) U.S. Cl.
    CPC ....... *G08G 1/096791* (2013.01); *G08G 1/161* (2013.01); *G08G 1/166* (2013.01); *B60W 2050/146* (2013.01); *G01S 2013/9353* (2013.01)

(58) Field of Classification Search
    CPC .................. G08G 1/096791; G01S 13/931; B60Q 9/008; B60Q 1/525; B60Q 5/006; B60W 50/14
    USPC .......................... 340/435, 903; 701/300, 301
    See application file for complete search history.

(56) References Cited

U.S. PATENT DOCUMENTS

| | | | | |
|---|---|---|---|---|
| 2009/0237226 | A1* | 9/2009 | Okita | B60W 10/184 340/435 |
| 2011/0267184 | A1* | 11/2011 | Lee | B60Q 9/005 340/435 |
| 2012/0010762 | A1* | 1/2012 | Asano | G08G 1/166 701/1 |
| 2012/0161951 | A1* | 6/2012 | Ito | B60Q 9/008 340/435 |
| 2013/0223686 | A1* | 8/2013 | Shimizu | G08G 1/166 382/103 |
| 2014/0266655 | A1* | 9/2014 | Palan | G06K 9/00805 340/435 |
| 2017/0342741 | A1* | 11/2017 | Holland | E05B 45/06 |

FOREIGN PATENT DOCUMENTS

| | | |
|---|---|---|
| KR | 10-1300534 B1 | 9/2013 |
| KR | 10-1308285 B1 | 9/2013 |
| KR | 10-2013-0113088 A | 10/2013 |

* cited by examiner

ACCIDENT HAS
OCCURRED

VEHICLE CONTROL APPARATUS, VEHICLE DRIVING ASSISTANCE APPARATUS, MOBILE TERMINAL AND CONTROL METHOD THEREOF

CROSS REFERENCE TO THE RELATED APPLICATIONS

This application is the National Phase of PCT International Application No. PCT/KR2015/002697, filed on Mar. 19, 2015, which claims priority under 35 U.S.C. 119(a) to Patent Application No. 10-2015-0029996, filed in Korea on Mar. 3, 2015, all of which are hereby expressly incorporated by reference into the present application.

BACKGROUND OF THE INVENTION

1. Field of the Invention

The present disclosure relates to a vehicle control apparatus, a vehicle driving assistance apparatus, a mobile terminal and a control method thereof.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals may receive multicast signals for providing video contents such as broadcasts, videos, television programs, or the like.

As it becomes multifunctional, for example, such a terminal is allowed to capture still images or moving images, play music or video files, play games, receive broadcast and the like, so as to be implemented as an integrated multimedia player. In order to support and enhance the functions of the terminal, the improvement of structural or software elements of the terminal may be taken into consideration.

On the other hand, in the automotive field, in the related art, the operation of a vehicle has been basically controlled by a driver's manipulation. In other words, the driver should directly manipulate a steering wheel, a brake or the like to drive the vehicle. The driver exerts effects on the driving of the vehicle due to physical factors and external environmental factors. For example, the driving of the vehicle varies due to a driver's degree of tiredness, a driver's degree of concentration, an external environment, etc.

A traffic accident may occur due to such physical factors and external environmental factors. Various apparatuses and methods have been developed to prevent a traffic accident from occurring due to such physical and environmental factors. On the other hand, when a traffic accident occurs on a road, a chain collision accident may occur by a trailing vehicle. In the related art, braking apparatuses or the like have been developed to prevent such a chain collision accident.

In recent years, automobiles for controlling the operation of the vehicle by the vehicle itself have been developed. For an example of such a vehicle, there is a smart car. In case of a smart car, it may sense various information required for the driving of the vehicle, and perform the driving of the vehicle based on them without a driver's additional manipulation.

However, even in such a case, when a traffic accident is expected to occur or a traffic accident has occurred, it is required to provide a method of properly notifying a user of it. When a traffic accident is expected to occur or a traffic accident has occurred, the present disclosure proposes a method of notifying a driver of it through various means such as a mobile terminal, a vehicle assistance apparatus and the like, thereby preventing a chain collision accident.

SUMMARY OF THE INVENTION

An aspect of the present disclosure is to estimate the occurrence of a traffic accident in advance, thereby preventing it.

Furthermore, another aspect of the present disclosure is to estimate the occurrence of a traffic accident in advance, thereby minimizing the damage of the accident.

Furthermore, still another aspect of the present disclosure is to prevent a chain collision accident when a traffic accident has occurred.

The present disclosure relates to a mobile terminal and a control method thereof, and the mobile terminal may include an output unit, a wireless communication unit configured to receive at least one of information associated with an object located adjacent to a vehicle and driving information associated with the driving of the vehicle from one or more external devices, and a controller configured to determine a collision possibility between the object and the vehicle based on the driving information associated with the driving of the vehicle and the information associated with the object to control the output unit to output notification information for notifying the collision possibility when there is a collision possibility between the vehicle and the object as a result of the determination.

According to an embodiment, when there is the collision possibility in a state that route guidance information is displayed on the output unit, the controller may output the notification information in association with the route guidance information.

According to an embodiment, the notification information may include information associated with the avoidance of the collision to disallow the vehicle to collide with the object.

According to an embodiment, the route guidance information may be displayed in an enlarged manner based on the location of the vehicle, and the information associated with the avoidance of the collision may be outputted to an enlarged portion of the route guidance information.

According to an embodiment, the information associated with the avoidance of the collision may be location information for which the movement of the vehicle is recommended to avoid a collision between the vehicle and the object.

According to an embodiment, the location information for which the movement of the vehicle is recommended may be transmitted to the vehicle to be used in the vehicle.

According to an embodiment, the controller may output notification information for notifying the collision possibility through at least one of visual, auditory and tactile methods.

According to an embodiment, the notification information may be changed from any one of the visual, auditory and tactile methods to another one thereof according to a degree of the collision possibility.

According to an embodiment, when there is the collision possibility, the controller may transmit collision possibility information indicating the collision possibility to the vehicle through the wireless communication unit to output the notification information to the vehicle.

According to an embodiment, the controller may sense whether or not the notification information is outputted to the vehicle, and transmit the notification information to the vehicle until the notification information is outputted to the vehicle.

According to the present disclosure, there is provided a driving assistance apparatus, and the driving assistance apparatus may include an light output unit mounted on a vehicle to output light, a sensing unit configured to sense information associated with an object located adjacent to the vehicle, a wireless communication unit configured to receive driving information associated with the driving of the vehicle from the vehicle, and a controller configured to determine a collision possibility of the vehicle based on information associated with the object and the driving information to control the light output unit to output light when there is a collision possibility between the vehicle and the object.

According to an embodiment, the light output unit may be configured to change the output direction of the light, and the controller may control the output direction of the light based on a shape of a road when there is the collision possibility.

According to an embodiment, the controller may output light toward a first direction when a curvature of the road is a first curvature, and output light toward a second direction when the curvature of the road is a second curvature different from the first curvature.

According to an embodiment, when there is the collision possibility, the controller may calculate a cause point of the collision possibility based on the movement information of the vehicle, and control the light output unit to irradiate the light to the cause point of the collision possibility.

According to an embodiment, the driving assistance apparatus may further include a coloring unit configured to coat a paint on a road to form a solid layer, wherein the controller controls the coloring unit to coat the paint on a cause point of the collision possibility.

According to an embodiment, the controller may control the coloring unit to coat a different color of paint based on the driving information.

According to an embodiment, the driving assistance apparatus may further include a camera unit configured to capture nearby video as an image, wherein when there is the collision possibility, the controller detects the location of at least one nearby object from an image of the nearby video, and determines an output path of light to irradiate the light to any one of the detected at least one nearby object.

According to an embodiment, when it is determined that there does not exist a vehicle located within a preset range or a curvature of a road is above a preset curvature based on the vehicle, the controller may irradiate light to the nearby object.

According to an embodiment, the light output unit may be configured to project light from the vehicle so as to output light above a predetermined height, and the controller may discharge the light output unit to an outside of the vehicle when there is the collision possibility.

According to an embodiment, when there is the collision possibility, the controller may transmit collision possibility information indicating that there is a collision possibility to the vehicle to output notification information from the vehicle.

According to the present disclosure, there is provided a vehicle including an output unit, a wireless communication unit configured to receive at least one of information associated with an object located adjacent to a vehicle and driving information associated with the driving of the vehicle from one or more external devices, and a controller configured to determine a collision possibility between the object and the vehicle based on the driving information associated with the driving of the vehicle and the information associated with the object to control the output unit to output notification information for notifying the collision possibility when there is a collision possibility between the vehicle and the object as a result of the determination.

According to an embodiment, the notification information may be outputted in at least one of visual, auditory and tactile methods, and the controller may switch any one of the visual, auditory and tactile methods to another one thereof according to a degree of the collision possibility.

According to an embodiment, when there is the collision possibility, the controller may calculate a cause point of the collision possibility based on the driving information, and provide notification information for notifying nearby vehicles of the cause point of the collision possibility.

According to an embodiment, the vehicle may further include a coloring unit configured to coat a paint on a road to form a solid layer, wherein the controller controls the coloring unit to coat the paint on a cause point of the collision possibility.

According to an embodiment, the controller may control the coloring unit to coat a different color of paint based on the driving information.

According to the present disclosure, there is provided a control method of a mobile terminal, and the method may include calculating a speed of a vehicle using the location information of the mobile terminal or receiving the speed of the vehicle from an outside thereof, receiving information associated with an object located adjacent to the vehicle from an external device, determining a collision possibility between the object and the vehicle using the speed of the vehicle and the information associated with the object, and outputting notification information for notifying the collision possibility through an output unit when the vehicle has a collision possibility with the object.

According to an embodiment, the notification information may be outputted in association with route guidance information.

According to an embodiment, the notification information may include information associated with the avoidance of the collision to disallow the vehicle to collide with the object.

According to an embodiment, information associated with the avoidance of the collision may be location information for which the movement of the vehicle is recommended to avoid a collision between the vehicle and the object.

According to an embodiment, the method may further include transmitting notification information to an external device to output the notification information for notifying the collision possibility to the external device.

The effects according to the present disclosure will be described as follows.

The present disclosure may estimate a collision possibility of a vehicle based on the driving information of the vehicle and information associated with an object located adjacent to the vehicle, and provide notification information for notifying it a driver of the vehicle and a driver of a nearby vehicle. Through this, the present disclosure may prevent a chain collision accident due to a vehicle located in the rear even when a collision accident of the vehicle occurs.

Furthermore, the present disclosure may predict a collision possibility, and transmit it to at least one of a vehicle and a driving assistance apparatus, thereby providing a driver of the vehicle and a driver of a nearby vehicle. Through this, the present disclosure may provide a method capable of performing the same operation as that of a smart car even in a typical automobile in the related art.

Further scope of applicability of the present invention will become apparent from the detailed description given hereinafter. However, it should be understood that the detailed description and specific examples such as preferred embodiments of the invention are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENTS

Hereinafter, an embodiment disclosed in the present disclosure will be described in detail with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context. Terms "include" or "has" used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptops, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1:
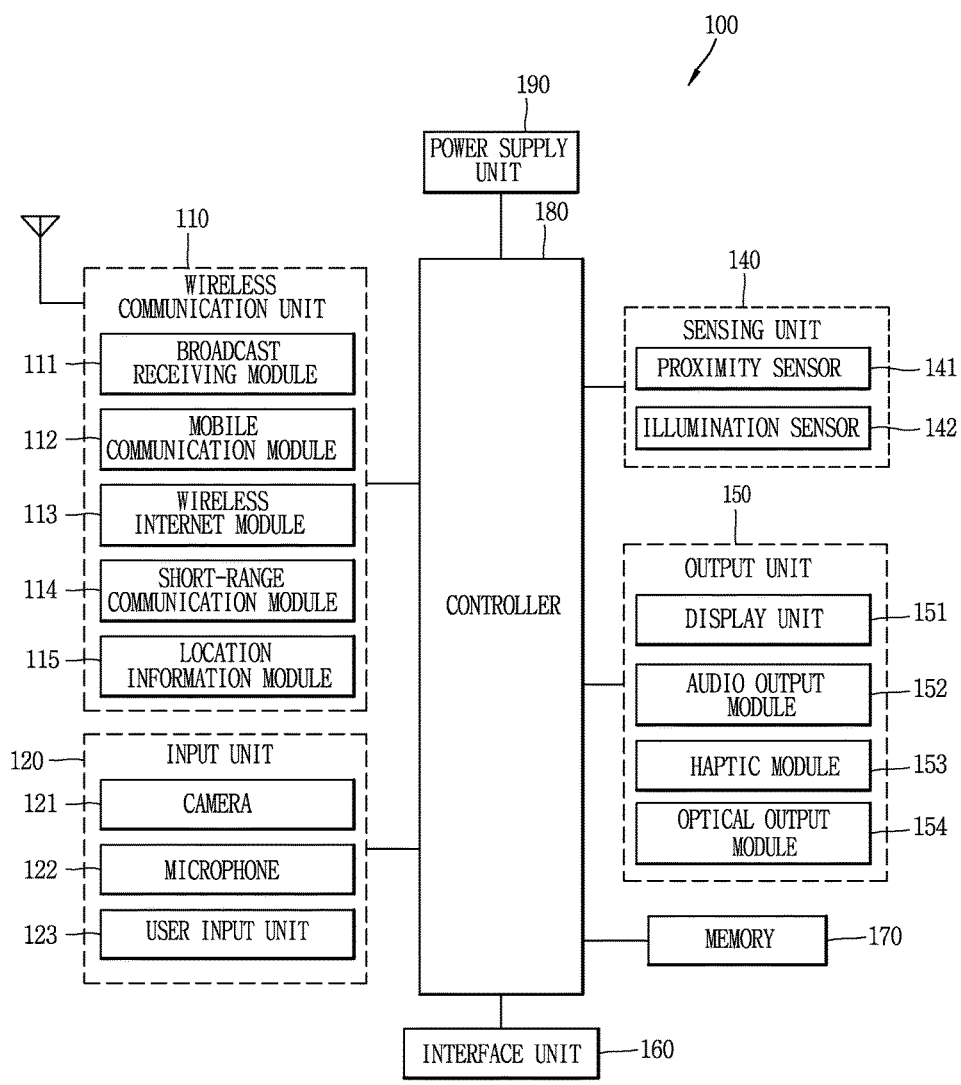
FIG. 1 is a block diagram for explaining a mobile terminal associated with the present disclosure.

FIG. 1 is a block diagram of a mobile terminal in accordance with the present disclosure.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, surrounding environmental information of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, a light output unit 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1, prior to explaining various exemplary embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages. The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glasses or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

According to the need, the location information module 115 may perform any function of the other modules of the wireless communication unit 110 to obtain data for the location of the mobile terminal in a substitutional or additional manner. The location information module 115 may be a module used to obtain the location (or current location) of the mobile terminal, and may not be necessarily limited to a module for directly calculating or obtaining the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion other than the touch screen. On the other hand, the virtual key or the visual key may be displayable on the touch screen in various shapes, for example, graphic, text, icon, video or a combination thereof.

On the other hand, the sensing unit 140 may sense at least one of internal information of the mobile terminal, surrounding environmental information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

On the other hand, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.).

On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors as described above, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor. The camera 121 and the laser sensor may be combined to detect a touch of the sensing object with respect to a 3D stereoscopic image.

The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects that the user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

A light output unit 154 may output a signal for indicating an event generation using light of a light source. Examples of events generated in the mobile terminal 100 may include reception of a message, a call signal, an alarm, a schedule notice, an email, an information through an application or a missed call and the like.

A signal output by the light output unit 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

On the other hand, as aforementioned, the controller 180 may typically control the general operations of the mobile terminal 100. For example, the controller 180 may set or release a locked state for restricting a user from inputting a control command with respect to applications when a status of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or similar medium using, for example, software, hardware, or any combination thereof. Hereinafter, a communication system which is operable with the mobile terminal 100 according to the present disclosure will be described.

First, such communication system utilizes different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like.

By way of non-limiting example only, further description will relate to a CDMA communication system, but such teachings apply equally to other system types including a CDMA wireless communication system. A CDMA wireless communication system includes one or more mobile terminals 100, one or more base stations (BSs), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100 may cooperate with the CDMA wireless communication system. Such satellites 300 facilitate locating the position of the mobile terminal 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

A location information module 115 of the mobile terminal is configured to acquire a position of the mobile terminal. Such location information module 115 may include a Global Position System (GPS) module and a Wireless Fidelity (Wi-Fi) module. According to the need, the location information module 115 may perform any function of another module of the wireless communication unit 110 to obtain data for the location of the mobile terminal in a substitutional or additional manner.

The GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position. It is difficult to precisely measure a position of the mobile terminal using the GPS module, in a blind spot of satellite signals such as an indoor space. In order to compensate for the positioning technique using such GPS module, a Wi-Fi Positioning System (WPS) may be utilized.

The Wi-Fi positioning system (WPS) refers to a location determination technology based on a wireless local area network (WLAN) using Wi-Fi as a technology for tracking the location of the mobile terminal 100 using a Wi-Fi module provided in the mobile terminal 100 and a wireless access point for transmitting and receiving to and from the Wi-Fi module.

The Wi-Fi positioning system may include a Wi-Fi location determination server, a mobile terminal 100, a wireless access point (AP) connected to the mobile terminal, and a database stored with any wireless AP information. The mobile terminal 100 connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may be at least one of MAC address, Service Set IDentification (SSID), Received Signal Strength Indicator (RSSI), Reference Signal Received Power (RSRP), Reference Signal Received Quality (RSRQ), channel information, privacy, network type, signal strength and noise strength.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. Information included therein is compared with the received wireless AP information to extract (analyze) the location information of the mobile terminal 100.

A method for extracting (analyzing) location information of the mobile terminal 100 may include a Cell-ID method, a fingerprint method, a trigonometry method, a landmark method, etc. The Cell-ID method is used to determine a position of a wireless AP having the largest signal strength, among peripheral wireless AP information collected by a mobile terminal, as a position of the mobile terminal. The Cell-ID method is advantageous in that an implementation is simple, additional costs are not required, and location information can be rapidly acquired. However, the Cell-ID method is disadvantageous in that precision of positioning is lowered when an installation density of a wireless AP is low.

The fingerprint method is used to collect signal strength information by selecting a reference position from a service area, and to track a position of a mobile terminal using the signal strength information transmitted from the mobile terminal based on the collected information. In order to use the fingerprint method, characteristics of radio signals should be pre-stored in the form of database.

The trigonometry method is used to calculate a position of a mobile terminal, based on a distance between coordinates of at least three wireless APs and the mobile terminal. In order to measure the distance between the mobile terminal and the wireless AP, signal strength may be converted into distance information, or Time of Arrival (ToA) taken for wireless signals to be transmitted may be used.

The landmark method is used to measure a position of a mobile terminal using a known landmark transmitter. Besides the above methods, various algorithms may be used to extract (analyze) location information of a mobile terminal. Such extracted location information of the mobile terminal 100 is transmitted to the mobile terminal 100 through the Wi-Fi location determination server, thereby acquiring location information of the mobile terminal 100.

The mobile terminal 100 may acquire location information by being connected to at least one wireless AP. The number of wireless APs required to acquire location information of the mobile terminal 100 may be variously changed according to a wireless communication environment where the mobile terminal 100 is positioned.

As aforementioned with reference to FIG. 1A, a short-range communication technique, such as Bluetooth™, Radio Frequency Identification (RFID), Infrared Data Association (IrDA), Ultra Wideband (UWB), ZigBee and Near Field Communication (NFC), may be applicable to the mobile terminal according to the present invention.

An NFC module provided at the mobile terminal supports short-range wireless communication, a non-contactable type between mobile terminals, within about 10 cm. The NFC module may operate in one of a card mode, a reader mode and a P2P mode. The mobile terminal 100 may further include a security module for storing card information, in order to operate the NFC module in a card mode. The security module may be a physical medium such as UICC (Universal Integrated Circuit Card) (e.g., SIM (Subscriber Identification Module) or USIM (Universal SIM)), a secure micro SD and a sticker, or a logical medium (e.g., embedded SE (Secure Element)) embedded in the mobile terminal. SWP (Single Wire Protocol)-based data exchange may be performed between the NFC module and the security module.

When the NFC module operates in a card mode, the mobile terminal may transmit card information on a general IC card to outside. More specifically, if a mobile terminal having therein card information on a payment card (e. g, a credit card or a bus card) is made to approach to a card reader, a short-range mobile payment may be executed. On the other hand, if a mobile terminal which stores card information on an entrance card is made to approach to an entrance card reader, an entrance approval procedure may start.

A card such as a credit card, a traffic card and an entrance card may be mounted in the security module in the form of applet, and the security module may store card information on the card mounted therein. Card information of a payment card may be at least one of a card number, a remaining amount and a usage history. Card information of an entrance card may be at least one of a user's name, a user's number (e.g., undergraduate number or staff number) and an entrance history.

When the NFC module operates in a reader mode, the mobile terminal may read data from an external tag. The data received from the external tag by the mobile terminal may be coded into the NFC Data Exchange Format defined by the NFC Forum. The NFC Forum defines four record types. More specifically, the NFC Forum defines four RTDs (Record Type Definitions) such as Smart Poster, Text, URI (Uniform Resource Identifier) and General Control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

When the NFC module operates in a peer-to-peer (P2P) mode, the mobile terminal may execute P2P communication with another mobile terminal. In this case, LLCP (Logical Link Control Protocol) may be applied to the P2P communication. For the P2P communication, connection may be generated between the mobile terminal and said another mobile terminal. The connection may be categorized into a connectionless mode which ends after one packet is switched, and a connection-oriented mode in which packets are switched consecutively. For the P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is short.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof.

In the following description, the drawings will be described in sequence in a clockwise direction or described in sequence from the top to the bottom based on the upper left drawing. Furthermore, it should be noted that the same reference numerals are designated to the same constituent elements in the following drawings.

Hereinafter, when there is a danger of a traffic accident for a driver who is driving the vehicle 300 or a traffic accident has occurred, a method of notifying a user of it will be described in more detail with reference to the accompanying drawings.

Figure 2A:
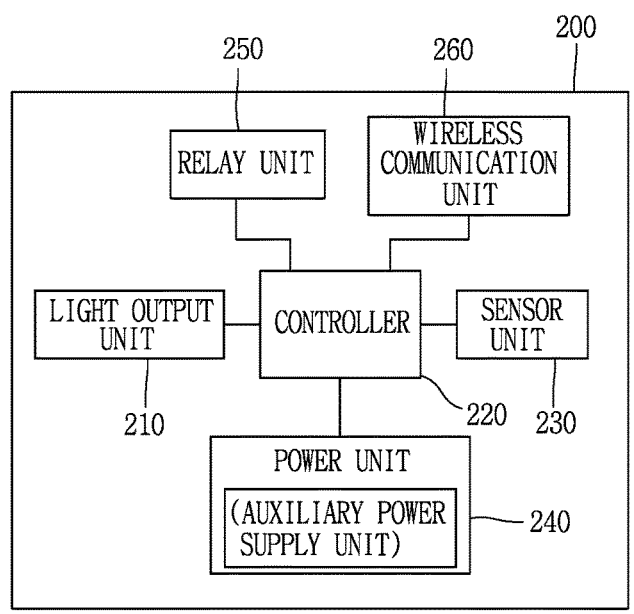
FIG. 2A is a block diagram illustrating the structure of a driving assistance apparatus 200 according to the present disclosure.
Figure 2B:
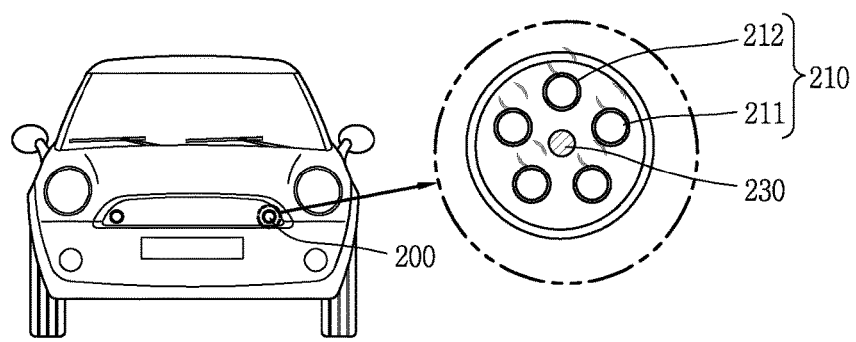
FIGS. 2B and 2C are conceptual views illustrating the location of the driving assistance apparatus 200 according to the present embodiment.
Figure 2C:
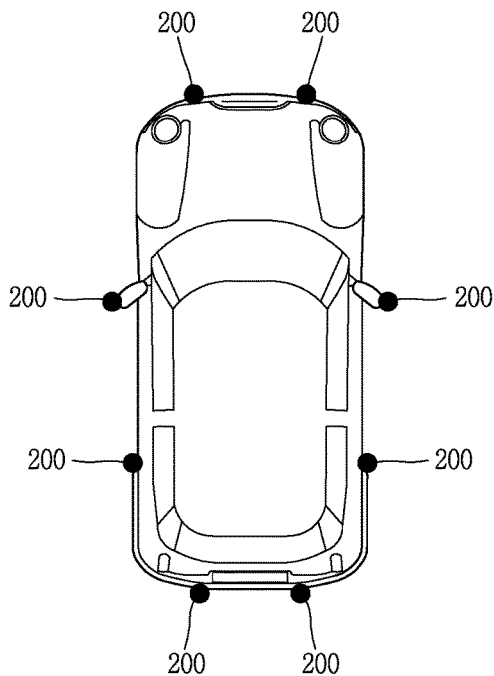

FIG. 2A is a block diagram illustrating the structure of a driving assistance apparatus 200 according to the present disclosure, and FIGS. 2B and 2C are conceptual views illustrating the location of the driving assistance apparatus 200 according to the present embodiment.

Referring to FIG. 2A, the driving assistance apparatus 200 may include at least one of a light output unit 210, a controller 220, a sensor unit (or sensing unit) 230, a power supply unit 240 and a relay unit (not shown). Furthermore, the driving assistance apparatus 200 may include one or more constituent elements of the foregoing mobile terminal.

The driving assistance apparatus 200 is a device of assisting control associated with the operation of the vehicle 300 through communication with the vehicle 300 or driving the vehicle 300 instead of a driver during the driving of the vehicle 300.

The driving assistance apparatus 200 may be integrated into the vehicle 300 or additionally configured in the vehicle 300, and configured to be detachable from the vehicle 300. When the driving assistance apparatus 200 is additionally configured in the vehicle 300, it may be formed to be detachable from the vehicle 300, and have a structure that is communicable with the controller (for example, ECU) of the vehicle 300.

Referring to FIG. 2C, when the driving assistance apparatus 200 is formed to be detachable from the vehicle 300, the driving assistance apparatus 200 may be attached to part of the body of the vehicle 300. For example, the driving assistance apparatus 200 may be attached to at least one of a front grill, a front bumper, a rear bumper, a trunk lid, a back panel, a side mirror, a side surface of the vehicle 300 in a detachable manner.

Referring to FIG. 2B, the light output unit 210 may be configured to output light, and configured with at least one lamp 211, 212. The at least one lamp 211, 212 as a lamp for outputting light may irradiate light to at least one of an inside or outside of the vehicle 300.

Furthermore, the at least one lamp 211, 212 may be a high power lamp with high visibility even at a bright or dark place. For example, the at least one lamp 211, 212 may be a light emitting diode (LED) lamp with a higher output efficiency than that of an incandescent or fluorescent lamp.

Furthermore, the at least one lamp 211 may all output lights having the same frequency or output lights having different frequencies. Here, lights having different frequencies may have different colors.

In case of outputting different colors, for the at least one lamp 211, each lamp may have a different output frequency of light to output a different color of light, or have a plurality of output frequencies of lights to output various lights from one lamp.

Here, when each of the at least one lamp has a different output frequency of light, the light output unit 210 may output light having one color through a combination of colors of lights outputted from each lamp or output light having a specific color using the color of light outputted from a specific one lamp.

Furthermore, the at least one lamp 211 may have a plurality of output frequencies with respect to the outputted light, and change a frequency of the outputted light based on a user's request and a predetermined condition to change the color of light. Through this, the at least one lamp may output light with a color with the highest visibility in the surrounding environment.

Furthermore, the light output unit 210 may further include a light signal separated from the driving assistance apparatus 200 to emit light while exploding at a predetermined height. For example, the light signal may be a flare, a flame signal or the like. The flare as a shell configured to illuminate the night, the ground and the sea may output light while exploding above a predetermined height.

The sensor unit 230 may sense information associated with an object located adjacent to the vehicle 300. The information associated with an object may be information required for the driving of the vehicle 300, and for example, the information associated with an object may be information associated with a vehicle located in the vicinity, a speed of a vehicle located in the vicinity, an acceleration of the vehicle, as well as information relating to a street light, a speed bump, a lane, a lane divider, a traffic light, a shape of a road, and the like.

The sensor unit 230 may be an infrared sensor using infrared light, an image sensor using an image, a radar sensor, an ultrasonic sensor, and the like to sense an object. The sensor unit 230 may include a plurality of different sensors to sense an object located adjacent to the vehicle 300. For example, the sensor unit 230 may include a first sensor configured to measure a distance to a nearby object using a radar and a second sensor configured to measure a distance to a nearby object using infrared light.

The plurality of sensors may be disposed at different locations of the body of the vehicle 300. For example, the first sensor provided with the sensor unit 230 may be disposed on a roof of the vehicle 300, and the second sensor may be disposed on a front/rear bumper. Through this, the driving assistance apparatus 200 may receive various information required for the driving of the vehicle 300 such as an object located in the vicinity based on the vehicle 300 using data received from the plurality of sensors.

On the other hand, the sensor unit 230 may not be an essential constituent element, and the driving assistance apparatus 200 may sense information through the sensing unit provided in an external device capable of performing communication with the driving assistance apparatus 200.

The power supply unit 240 may receive power through at least one of internal and external power sources to supply power to constituent elements constituting the driving assistance apparatus 200. For example, the power supply unit 240 may receive power from a power source of the vehicle 300 on which the driving assistance apparatus 200 is mounted or receive power from its own power source. The power supply unit 240 may include a battery, and the battery may be an embedded type of battery or replaceable type of battery.

Moreover, the power supply unit 240 may further include a secondary battery that can be used in an emergency situation. The secondary battery has a smaller capacity than that of an embedded type of battery that is basically mounted thereon, and is a battery that is used for the secondary purpose.

The secondary battery may not be usually used in general cases, but when a preset condition is satisfied, for example, when it is determined that an impact is sensed on the vehicle 300 or power is not supplied to the driving assistance apparatus, the secondary battery may be activated to supply power to each constituent element. Through this, the driving assistance apparatus 200 may supply power for a predetermined period of time through the secondary battery even when power is not supplied in an emergency situation.

The relay unit may transfer information between the driving assistance apparatus 200 and the vehicle 300, or provide information associated with the driving assistance apparatus 200 to a user. More specifically, the relay unit may convert information into a suitable command used for each apparatus in information transfer between the driving assistance apparatus 200 and the vehicle 300 to transfer it to each apparatus. In other words, the relay unit may perform the role of transfer between two apparatuses using different language systems.

The relay unit is not an essential constituent element, but the driving assistance apparatus 200 and the vehicle 300 may be configured to be communicable without any additional relay unit. Furthermore, the relay unit may be integrated into the vehicle 300.

Furthermore, the driving assistance apparatus 200 may further include a wireless communication unit. In other words, short-range communication technologies described in the foregoing mobile terminal 100, such as Bluetooth™, Radio Frequency IDentification (RFID), Infrared Data Association (IrDA), Ultra-WideBand (UWB), ZigBee, Near Field Communication (NFC), Wireless Universal Serial Bus (Wireless USB), and the like, may be applicable to the driving assistance apparatus 200 to perform short-range communication with the vehicle 300 and mobile terminal.

Here, the driving assistance apparatus 200 may be provided with the relay unit and wireless communication unit in a separate manner, and the wireless communication unit may be integrated into the relay unit. The controller 220 may control the light output unit 210, sensor unit 230, relay unit, wireless communication unit and power supply unit 240 to control the driving assistance apparatus 200 to assist the operation of the vehicle. In other words, the controller 220 may receive power from the power supply unit 240 to supply power to each constituent element of the driving assistance apparatus 200, and control the light output unit 210 using information received from the sensor unit 230.

Controlling the driving assistance apparatus 200 may denote turning on or off the power of the driving assistance apparatus 200 or executing or ending a function of the driving assistance apparatus 200. For example, the controller 220 may control the light output unit 210 to output light or activate the sensor unit 230 to receive information through the sensor unit 230.

The controller 220 may receive the driving information of a vehicle from the vehicle 300 connected to the driving assistance apparatus 200 through the communication unit or relay unit. The driving information as all information associated with the driving of the vehicle may include the operation status information of each constituent element of the vehicle as well as information associated with the driving thereof.

For example, the driving information may be a speed of the vehicle, a driving distance of the vehicle, a location of the vehicle, a vibration of the vehicle, a moving direction of the vehicle, a sudden stop of the vehicle, a maximum instantaneous speed of the vehicle, a failure of a component, a shape of a road, a state of a road surface, and the like.

Furthermore, the controller 220 may receive information associated with an object located adjacent to a vehicle through the sensor unit 230. The controller 220 may estimate the possibility of a traffic accident using the information associated with the object and the driving information, and provide notification information thereon.

On the other hand, the driving assistance apparatus 200 according to the present embodiment may be controlled by an external device (for example, a vehicle mounted with the driving assistance apparatus 200, a mobile terminal) capable of performing communication with the driving assistance apparatus 200 without additionally having a controller.

Figure 3:
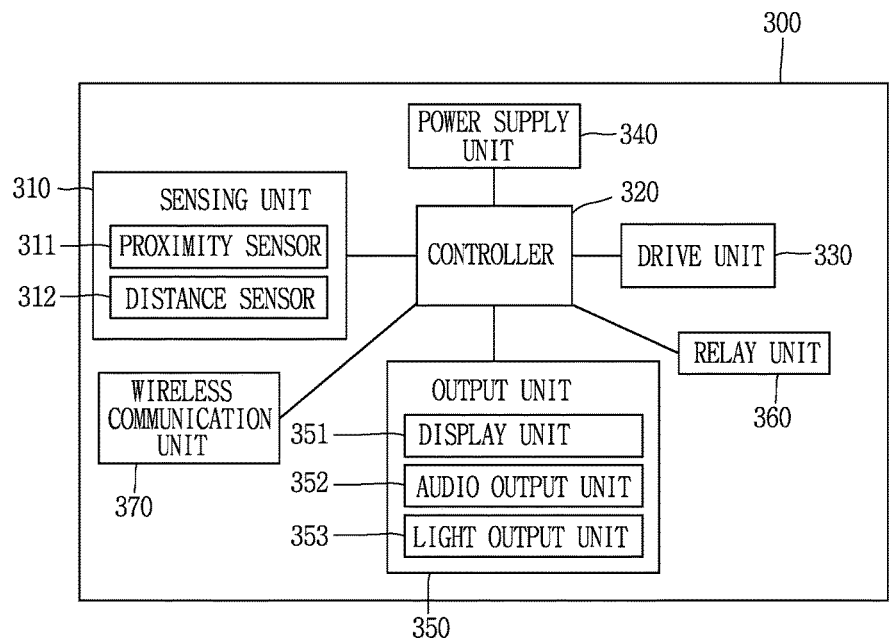
FIG. 3 is a block diagram illustrating a vehicle according to the present disclosure.

In the above, the driving assistance apparatus 200 according to the present disclosure has been described. Hereinafter, a vehicle 300 that can be coupled to the driving assistance apparatus 200 will be described. FIG. 3 is a block diagram illustrating a vehicle according to the present disclosure.

Referring to FIG. 3, the vehicle 300 according to the present disclosure may include at least one of a sensing unit 310, a controller 320, a drive unit 330, a power unit 340, an output unit 350, a wireless communication unit 370 and a relay unit 360. Furthermore, though not shown in the drawing, the vehicle 300 may include constituent elements typically included in a vehicle.

The sensing unit 310 may sense various information associated with the driving of the vehicle. The driving of the vehicle may denote overall operations associated with the driving of the vehicle, and may include parking and stopping of the vehicle as well as driving the vehicle by a driver.

The sensing unit 310 may include various sensors. For example, the sensing unit 310 may include a proximity sensor 311, a distance sensor 312, and the like. The proximity sensor 311 may be a sensor for sensing the location of an object located in the proximity of the vehicle 300, and technologies such as a method of coupling a Hall device to a permanent magnet to use a magnetic field, a method of coupling a light emitting diode to an optical device, a method of sensing a change of electrostatic capacitance, and the like may be applicable thereto. The distance sensor 312 may measure a distance to an object located adjacent to the vehicle 300, and may include an infrared sensor using infrared rays, a radar sensor using a radar, an ultrasonic sensor using ultrasonic waves, and the like.

The drive unit 330 may perform various operations for the driving of the vehicle 300. For example, the vehicle drive unit 330 may control gears to adapt to a speed of the vehicle 300 or control a fuel supply amount of an engine to change the speed of the vehicle 300 or control a brake unit to stop the rotation of the wheels of the vehicle 300.

The power supply unit 340 may supply power to each constituent element of the vehicle 300 from external or internal power source as described in the foregoing mobile terminal 100 and driving assistance apparatus 200. The output unit 350 may output various information associated with the driving of the vehicle in any one of visual, tactile and auditory methods. The output unit 350 may include a display unit 351, an audio output unit 352 and a light output unit 353.

The display unit 351 may be configured to visually display information, and may perform the same role as described above in FIG. 1A. The audio output unit 352 may configured to auditorily output information, and may include a claxon, a speaker, and the like.

The light output unit 353 may have the same configuration as that of the light output unit in the driving assistance apparatus as described above in FIG. 2A. In other words, the light output unit 353 may include at least one lamp for emitting light. The light output unit 353 may be installed in the front, the side and the rear of the vehicle 300, and used for the purposes of illuminating a road at a dark place and providing notification to a nearby vehicle.

The relay unit 360 may be integrated into the vehicle 300 or connected to a vehicle as an additional module to perform the role of relay between the vehicle 300 and an external device so as to allow the controller 320 of the vehicle 300 to recognize or use the external device. For example, the relay unit 360 may receive sensor information from an external sensor, and process the sensor information in a format that can be recognized by the controller 320, and provide it to the controller 320 to allow the controller 320 to use it. Furthermore, the relay unit 360 may receive driving information from the controller 320 to provide it to a user.

As an example of the relay unit 360, on board diagnostics (OBD) may be used. The OBD as a configuration for sensing the overall operations of a vehicle may be connected to the vehicle 300 to receive driving information from the controller 320 or provide information received from an external device to the controller 320. The OBD may have a standard interface with 16 pins.

On the other hand, the relay unit 360 may not be an essential constituent element, and may be replaced by a partial configuration of the controller 320. In the following description, it will be described in such a manner that the role of the relay unit 360 is carried out by the controller 320, and in this case, the relay unit 360 may be one constituent element of the controller 320. Furthermore, for a control method used in the following description, the relay unit 360 may be additionally configured therein, and may be also applicable in a similar manner to a case of being connected to the controller 320.

The wireless communication unit 370 may perform communication in a wireless manner to transmit and receive information to and from an external device and an external server. The wireless communication unit 370 may perform communication in a similar manner as described above in FIG. 1A. For example, the wireless communication unit 370 may support Bluetooth technologies to perform communication with an external device located at a near distance.

The controller 320 may be connected to each constituent element of the vehicle 300 to control the operation of the vehicle 300. For example, the controller 320 may control the driving status of a vehicle such as engine, automatic transmission, ABS, and the like in an electronic manner. Such a controller may be referred to as an electronic control unit (ECU).

Furthermore, the controller 320 may control each constituent element of the vehicle 300 based on information received from an external device. For example, when information associated with a collision possibility of the vehicle 300 is received from the mobile terminal 100, the controller 320 may control the light output unit 353 to output light based on information associated with the received collision possibility. In the above, a vehicle according to the present disclosure has been described.

Figure 4:
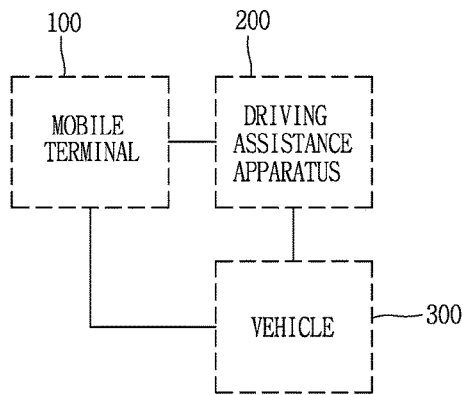
FIG. 4 is a conceptual view illustrating a relationship among a vehicle, a vehicle and driving assistance apparatus.
Figure 5A:
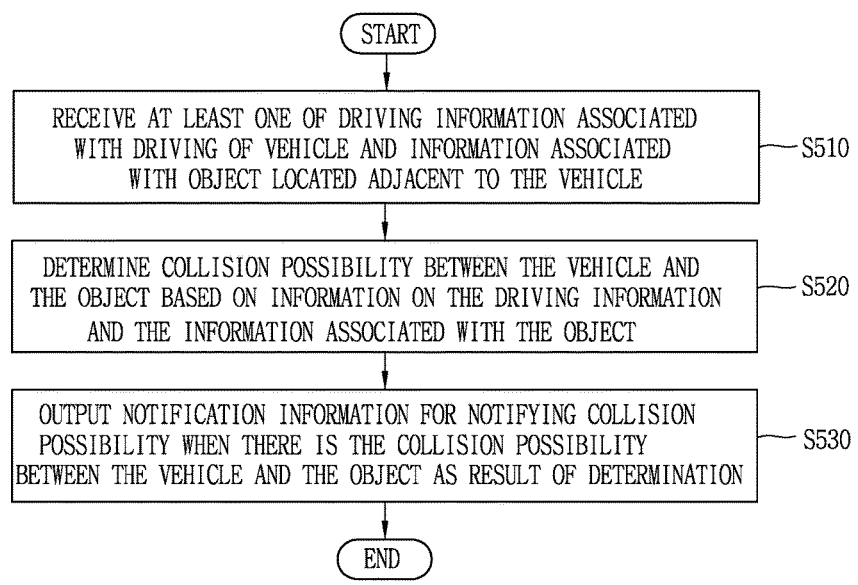
FIGS. 5A, 5B and 5C are flow charts illustrating a method of determining a collision possibility of the vehicle.
Figure 5B:
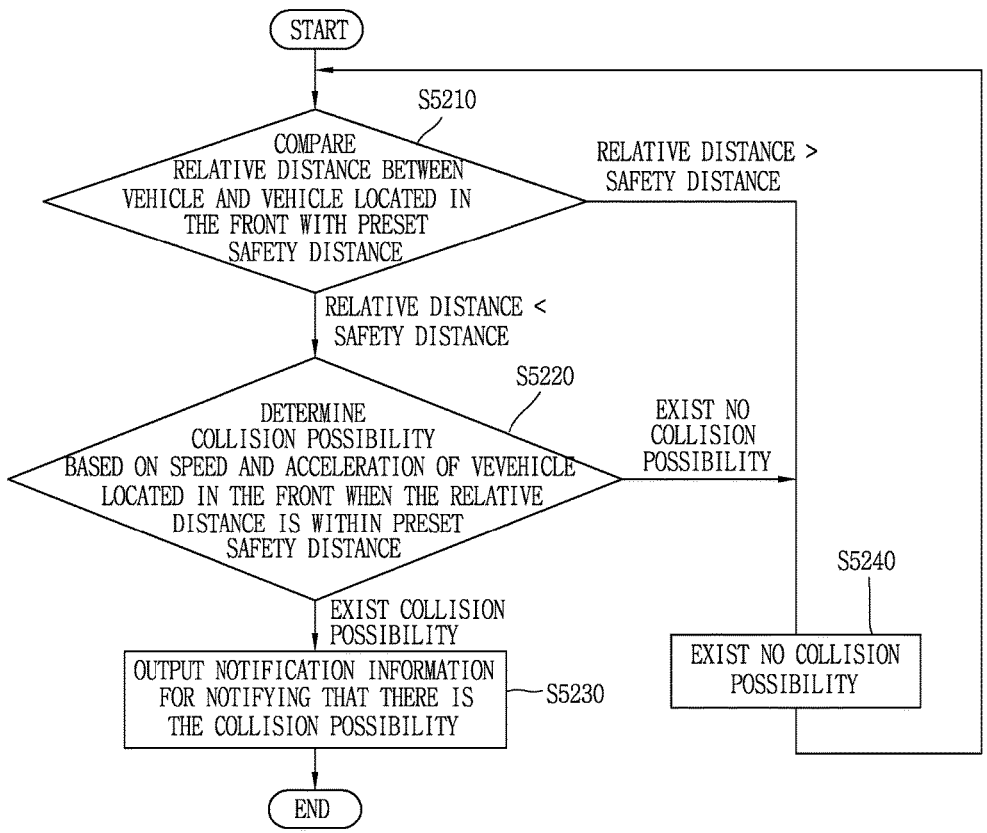
Figure 5C:
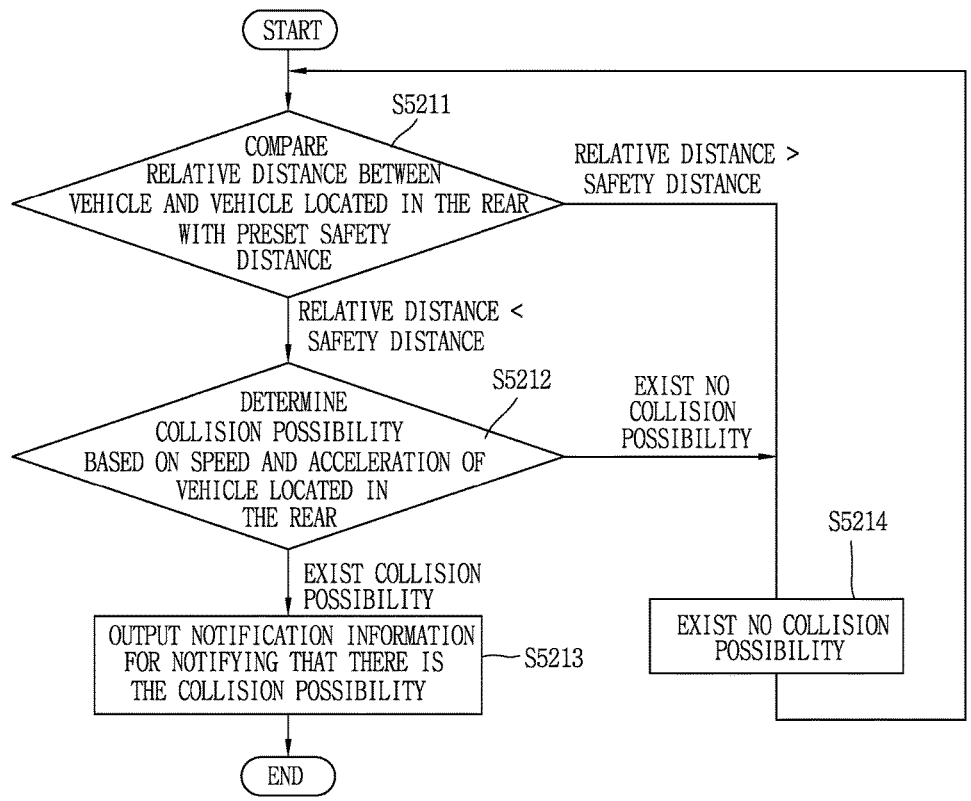

Hereinafter, a method of providing notification information to a user in connection with the mobile terminal 100, the driving assistance apparatus 200 and the vehicle 300 according to the present disclosure will be described. FIG. 4 is a conceptual view illustrating a relationship among a vehicle, a vehicle and driving assistance apparatus. FIGS. 5A, 5B and 5C are flow charts illustrating a method of determining a collision possibility of the vehicle, and FIGS. 6A, 6B, 6C, 6D and 6E are conceptual views illustrating a method of outputting notification information for notifying a collision possibility of the vehicle.

Hereinafter, a method of being controlled in a mobile terminal around the mobile terminal will be described, but the present disclosure may not be necessarily limited to this, and may be also implemented in a similar manner through a controller in a vehicle itself, a controller in a driving assistance apparatus or a combination thereof.

First, a mobile terminal according to the present disclosure may receive at least one of driving information associated with the driving of a vehicle and information associated with an object located adjacent to the vehicle from one or more external devices (S510).

The mobile terminal 100 according to the present disclosure may include at least one of a display unit 151, a wireless communication unit 110 and a controller 180. The wireless communication unit 110 may transmit and receive information to and from an external device in a wireless manner as illustrated in FIG. 1A. For example, the wireless communication unit 110 may receive at least one of driving information associated with the driving of the vehicle and information associated with the object from the vehicle 300 and driving assistance apparatus 200 located at a near distance based on Bluetooth communication.

The controller 180 may transmit and receive information to and from one or more external devices through wireless communication. The one or more external devices may be at least one of the vehicle 300 and the driving assistance apparatus 200 capable of allowing communication or performing communication with the mobile terminal 100.

First, the controller 180 may receive driving information associated with the driving of the vehicle from the vehicle 300 through the wireless communication unit 110. The driving information associated with the driving of the vehicle may be received directly from the vehicle 300 or received through the driving assistance apparatus 200 when it is unable to be directly received from the vehicle 300.

For example, when it is allowed to be directly received from the vehicle 300, the controller 180 may receive driving information associated with the driving of the vehicle through the relay unit 360 and wireless communication unit 370 provided in the vehicle 300. For another example, when it is not allowed to be directly received from the vehicle 300, the controller 180 may receive driving information associated with the vehicle through the relay unit and wireless communication unit provided in the driving assistance apparatus 200.

Here, the vehicle 300 may be a vehicle 300 having a history of previous communication connection with the mobile terminal 100 or a vehicle 300 for which communication connection with the vehicle 300 is allowed by the user of the mobile terminal 100. For example, the vehicle 300 may be a vehicle 300 in which there exists a history of Bluetooth communication with the mobile terminal 100 or a vehicle 300 set for the user of the mobile terminal 100 to allow Bluetooth communication.

Furthermore, the controller 180 may receive information associated with an object located adjacent to the vehicle 300 through the wireless communication unit 110. The information associated with an object adjacent to the vehicle 300 may be received from the vehicle 300 or received through an external device such as the driving assistance apparatus 200 or the like other than the vehicle 300.

The information associated with the object may be a relative distance between the vehicle 300 and the object, a speed of the object, an acceleration, a type of the object based on the vehicle 300, a relative location of the object based on the vehicle 300, and the like. The controller 180 may determine a collision possibility between the vehicle and the object based on information associated with the driving information and the object (S520).

A collision possibility between the vehicle and the object may denote a possibility of an impact being applied to the vehicle such as the vehicle and the object being colliding with or crashing into each other. Here, the crash may denote being collided with the front of the vehicle by the object, and the collision may denote being hit to the back of the vehicle 300 with the object. A collision possibility between the vehicle and the object may be understood as various names such as "accident possibility", "bump possibility", "clash possibility" or the like. In other words, the collision possibility may include a collision possibility with a vehicle located in the rear as well as a collision with a vehicle located in the front. Through this, the present disclosure may determine a collision possibility of the vehicle to predict the occurrence of a traffic accident in advance.

For example, the controller 180 may produce the collision possibility based on the speed information of the vehicle 300 included in the driving information and a relative distance to a vehicle located in the front and the speed and acceleration information of a vehicle located in the front with respect to the vehicle 300 included in information associated with the object. More specifically, the controller 180 may compare a relative distance between the vehicle 300 and a vehicle located in the front with a preset safety distance (S5210).

Here, the safety distance may denote a distance to a preceding car for the prevention of a traffic accident. In other words, the safety distance as a braking distance of the vehicle may be changed according to the speed, weather or the like. The controller 180 may produce the speed information of a vehicle through a position measurement unit (for example, GPS), and receive current weather information through the wireless communication unit to calculate a safety distance based on the speed information of the vehicle and the weather information.

Then, the controller 180 may determine a collision possibility based on the calculated safety distance (S5210). For example, when it is determined that a relative distance to a vehicle currently located in the front is less than the calculated safety distance, the controller 180 may determine that it has a high collision possibility. For another example, when it is determined that a relative distance to a vehicle currently located in the front is larger than the calculated safety distance, the controller 180 may determine that there is no collision possibility (S5240).

When the calculated safety distance is larger than the first distance, the controller 180 may determine that there in no collision possibility. However, when the calculated safety distance is less than the first distance, the controller 180 may determine a collision possibility based on the speed and acceleration of the object (S5220).

For example, when the calculated safety distance is less than the first distance, the controller 180 may compare a relative speed of the vehicle 300 with a preset speed. Here, when the relative speed of the vehicle 300 is higher than a preset speed, the controller 180 may determine that there is a collision possibility with the object. On the contrary, even when the first distance is less than the calculated safety distance, the controller 180 may determine that there in no collision possibility with the object when the relative speed of the vehicle 300 is lower than a preset speed (S5240).

For another example, when the vehicle 300 is at a first speed, and a vehicle located in the front of the vehicle 300 is an accident vehicle, the controller 180 may determine a collision possibility based on a relative distance to a vehicle located in the rear and the speed and acceleration information of the vehicle located in the rear.

More specifically, when it is sensed that there is an accident vehicle in the front, the controller 180 may determine a collision possibility with a vehicle located in the rear. In other words, when a vehicle located in the rear is at a second speed, and a relative distance to the vehicle located in the rear is a second distance, the controller 180 may determine that the collision possibility is high when the second distance is less than a preset safety distance, and determine that the collision possibility is low when the second distance is larger than a preset safety distance (S5211).

Here, the existence of an accident vehicle in the front may be i) determined based on driving information sensed from the sensing unit of the vehicle 300, ii) determined based on image information sensed through the camera unit of the mobile terminal 100 or iii) determined based on information sensed through the sensing unit of the driving assistance apparatus 200. Furthermore, the existence of an accident vehicle in the front may be determined based on information received through wireless communication from a preset external server (for example, traffic management server).

Here, when the relative distance is larger than a second distance, the controller 180 may determine that there is no collision possibility. On the contrary, when the relative distance is less than a second distance, the controller 180 may determine a collision possibility based on the speed and acceleration of a vehicle located in the rear (S5212). More specifically, when the relative speed of the vehicle is lower than a preset speed, the controller 180 may determine that there is no collision possibility (S5214). Furthermore, when the relative speed of the vehicle is higher than a preset speed, the controller 180 may determine that there is the collision possibility (S5213).

For another example, the controller 180 may determine a collision possibility with an object located in a side direction. More specifically, the controller 180 may determine a collision possibility with an object located in a side direction of the vehicle based on the moving direction and speed of a vehicle included in the driving information of the vehicle and a relative distance included in information associated with the object.

For example, when a vehicle moves in a right direction, and a relative distance to an object on the right side is less than a preset distance, the controller 180 may determine that there is a collision possibility. On the contrary, when the vehicle moves in a left direction even though a relative distance to an object located at the right side is less than a preset distance, the controller 180 may determine that there is no collision possibility.

On the other hand, the controller 180 may determine whether or not there is a collision possibility with the vehicle 300 in the front, the rear and the side in a separate or combined manner. Furthermore, the controller 180 may consider additional elements such as whether or not a sudden brake operation has been carried out in addition to the foregoing speed, relative distance and acceleration of the vehicle to determine whether or not there is the collision possibility.

As a result of the determination, when there is a collision possibility between the vehicle and the object, the controller 180 may output notification information for notifying the collision possibility (S430). The controller 180 may provide notification to a driver or provide notification information to a trailing vehicle when it is determined that there is a collision possibility, thereby preventing a collision accident.

The controller 180 may provide notification information using at least one of visual, tactile and auditory methods. For example, the controller 180 may visually display information associated with the collision possibility on the display unit 151. Furthermore, the controller 180 may auditorily output information associated with the collision possibility through a speaker. Furthermore, the controller 180 may output information associated with the collision possibility in a tactile manner through vibration.

Furthermore, when a degree of the collision possibility increases, the controller 180 may auditorily change notification information that has been visually outputted. When a relative distance between the object and the vehicle is reduced to increase a collision possibility while visually providing notification information, the controller 180 may auditorily switch the notification information.

Information associated with the collision possibility may include an accident point, a collision expected point, a collision expected direction, a collision possibility, a direction for collision avoidance, a collision avoidance location, a brake driving method and safety instruction information during collision. Through this, a user may predict the occurrence of a collision in advance to take an action for safety.

Figure 6A:
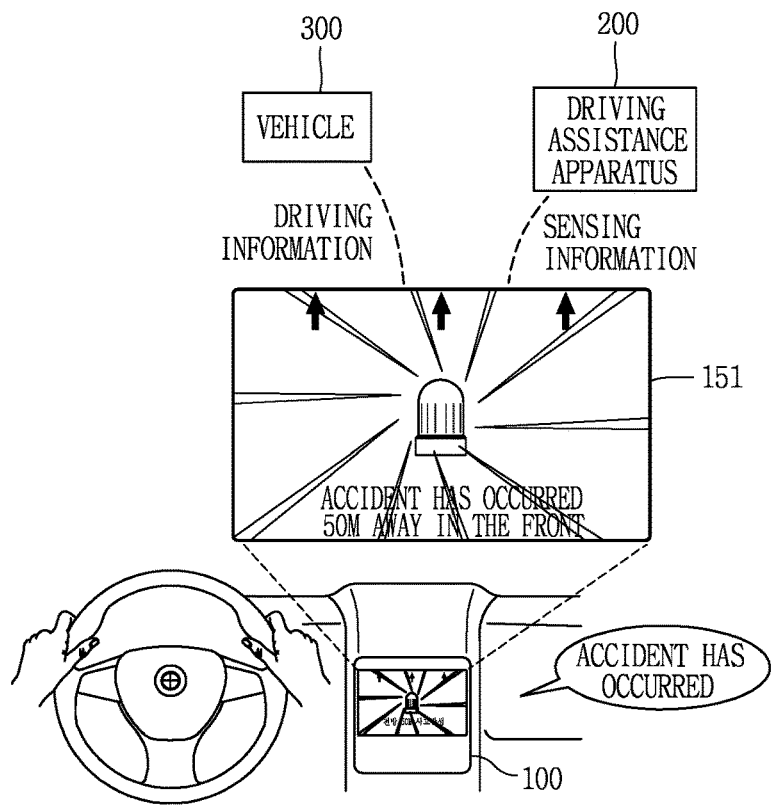
FIGS. 6A, 6B, 6C, 6D and 6E are conceptual views illustrating a method of outputting notification information for notifying a collision possibility of the vehicle.

For example, as illustrated in FIG. 6A, when an accident vehicle is sensed in the front of the vehicle, the controller 180 may display notification information indicating "an accident has occurred 50 meters away in the front" and an arrow indicating the front to show the location of accident occurrence on the display unit 151. Furthermore, the controller 180 may auditorily output the message of "an accident has occurred 50 meters away in the front" through the speaker.

Figure 6B:
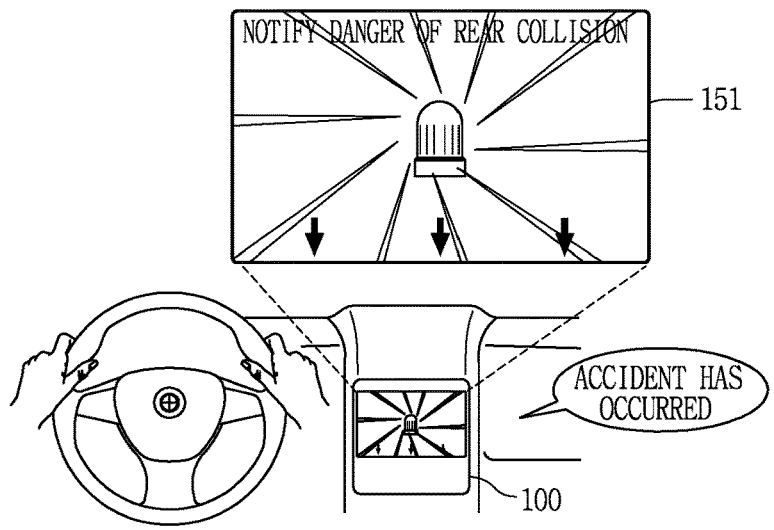

For another example, as illustrated in FIG. 6B, when a bump danger to the rear vehicle is sensed, the controller 180 may display "rear bump danger notification" information and an arrow indicating the rear to show the location of accident occurrence on the display unit. Furthermore, the controller 180 may auditorily output the "rear bump danger notification" through the speaker.

For still another example, the controller 180 may determine that there is a collision possibility in a state that a route guidance function is being carried out. The route guidance function is a function of providing a route between a departure and a destination using a location receiving unit provided in the mobile terminal.

Figure 6C:
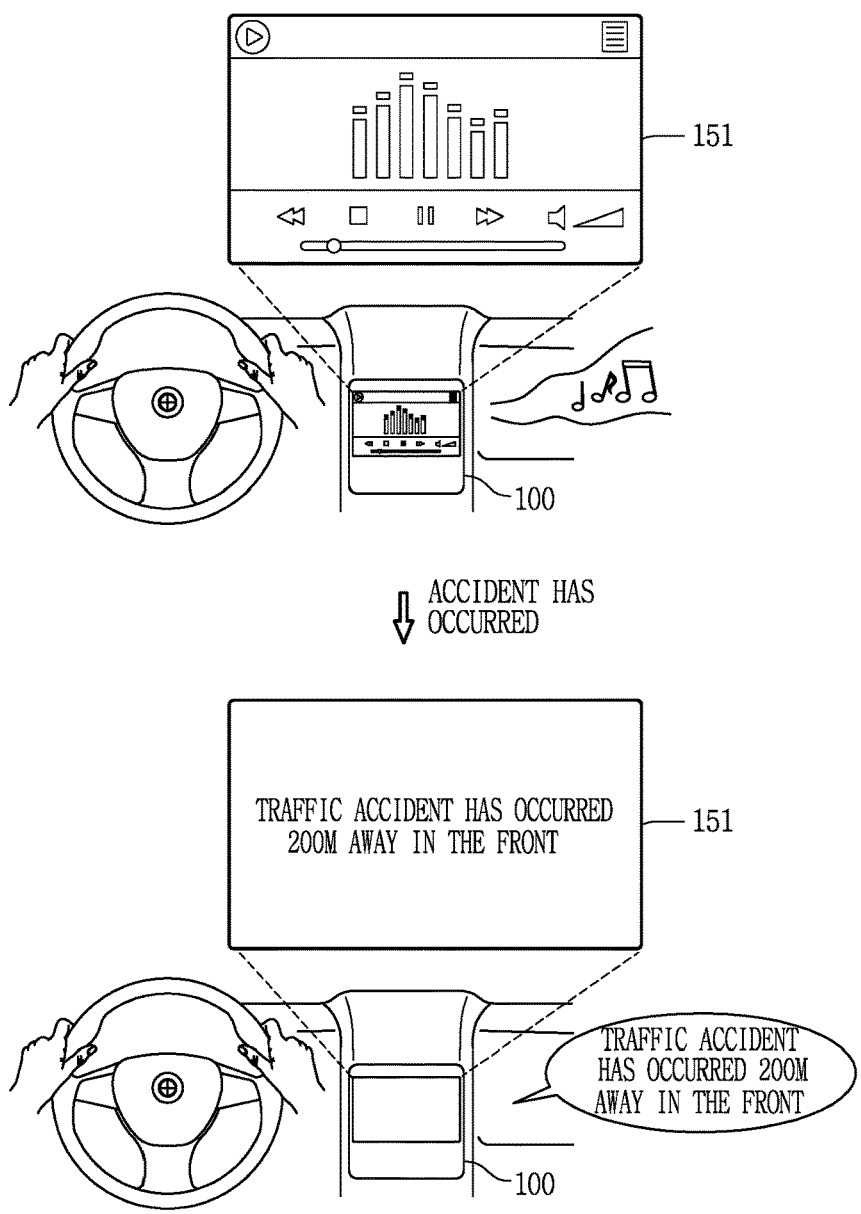

For example, as illustrated in the upper drawing of FIG. 6C, the controller 180 may display route guidance information associated with the route guidance function on the display unit 151. When it is determined that there is the collision possibility in a state that the route guidance information is displayed on the display unit 151, the controller 180 may display at least one of a collision avoidance location and direction at a current location of the vehicle 300 on the display unit 151.

The collision avoidance location is a location at which a collision with vehicles located in the vicinity can be avoided at a current location of the vehicle 300. The vehicles located in the vicinity of the vehicle may be vehicles located in the front, the rear and the side.

When it is determined that there is the collision possibility, the controller 180 may immediately end the route guidance of a destination, and immediately detect the collision avoidance location and direction in the route guidance function. Furthermore, the controller 180 may provide at least one of the collision avoidance location and direction on the display unit 151. For example, as illustrated in the lower drawing of FIG. 6C, the controller 180 may display route guidance information in an enlarged manner based on the current location of the vehicle in a state that the route guidance information is displayed, and display the collision avoidance location and direction to overlap with the route guidance information displayed in an enlarged manner. Furthermore, the controller 180 may auditorily output notification information indicating the "turn right" through the speaker.

Figure 6D:
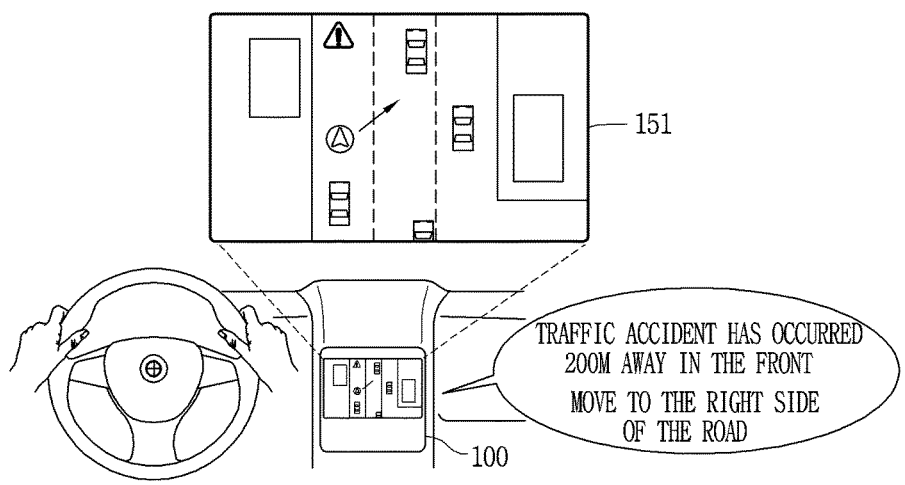
Figure 6E:
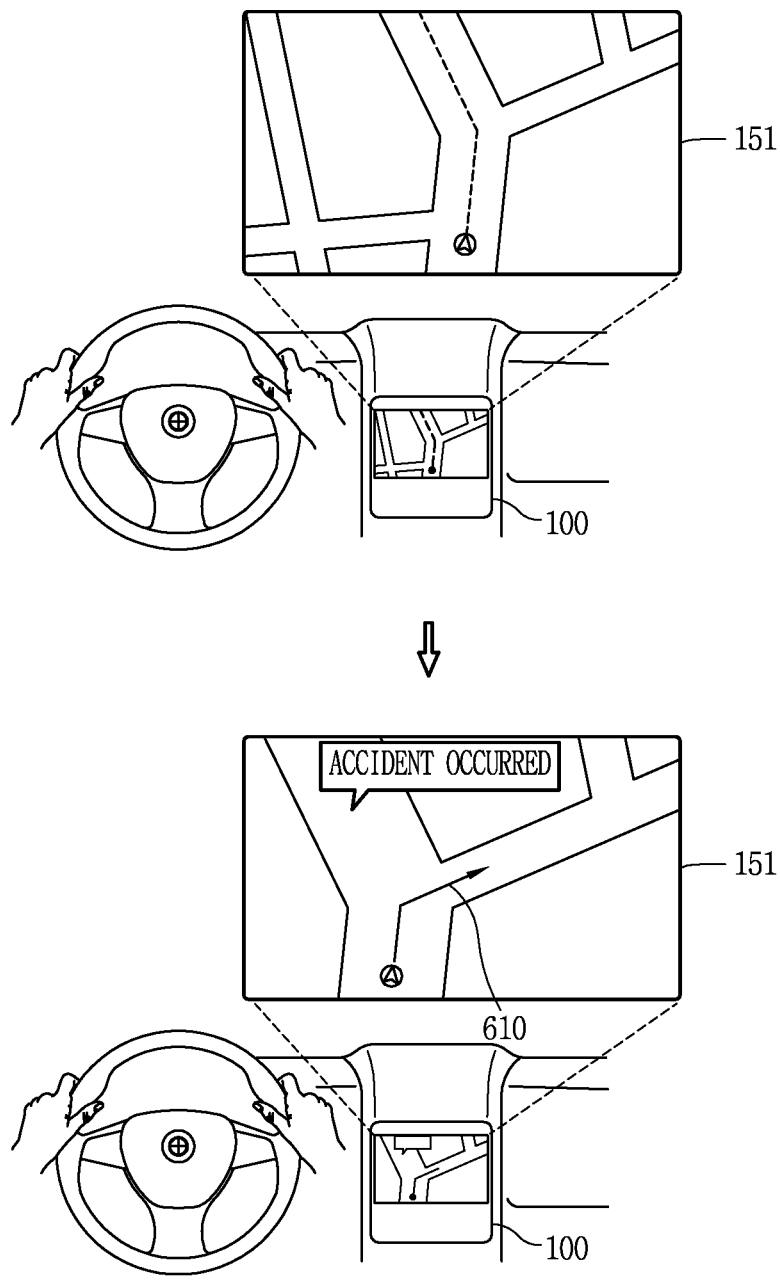

Moreover, when a vehicle is located on a road with two or more lanes, the controller 180 may detect at least one of the collision avoidance location and direction using road information and a relative distance between the vehicle and nearby vehicles. For example, when an accident has occurred at a preceding vehicle on a three-dimensional road, the controller 180 may detect an optimal avoidance distance based on a relative distance to vehicles located in the rear and the side. For example, as illustrated in FIG. 6D, the controller 180 may display notification information indicating "move to the right side of the road" on the display unit 151 based on road information and a relative distance to vehicles located in the front and the side. Furthermore, the controller 180 may auditorily output the "enter the right side of the road" through the speaker.

On the other hand, when a function that is not associated with route guidance information is being carried out on the mobile terminal, the controller 180 may end the function being carried out and display notification information. The function that is not associated with route guidance information may be a function that is not related to the driving of the vehicle such as traffic, pathfinding, map and the like. For example, the function that is not associated with route guidance information may be a function of playing music, a function of playing video, a DMB function, a call function, a text function, and the like. In other words, the function that is not associated with route guidance information may be a function of distracting a driver's attention to prevent the driving of the vehicle.

When it is determined that there is a collision possibility during the execution of such a function that is not associated with route guidance information, the controller 180 may end the function being carried out, and display notification information on the display unit 151. For example, as illustrated in the upper and lower drawings of FIG. 6E, when it is determined that an accident has occurred, the controller 180 may end a function of playing music that has been being carried out, and display notification information such as "a traffic accident has occurred 300 meters away in the front" on the display unit 151.

Through this, a user may receive information associated with a danger of a collision accident in advance, and moreover, receive information capable of avoiding a collision accident at the same time. In the above, when it is determined that there is a collision possibility, a method of notifying a nearby vehicle of it will be described.

Figure 7:
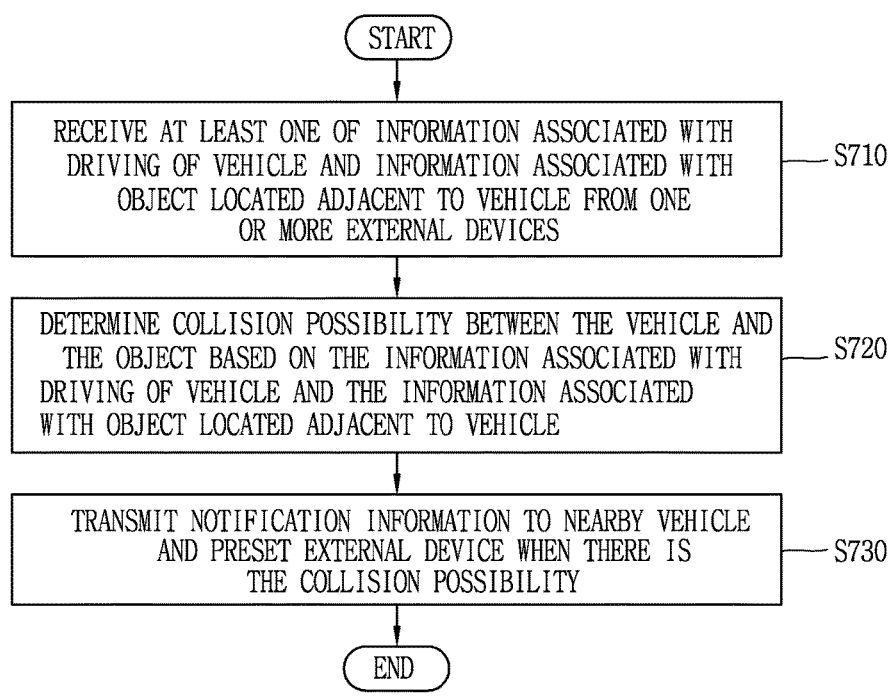
FIG. 7 is a flow chart illustrating a method of notifying a nearby vehicle of a collision possibility.
Figure 8A:
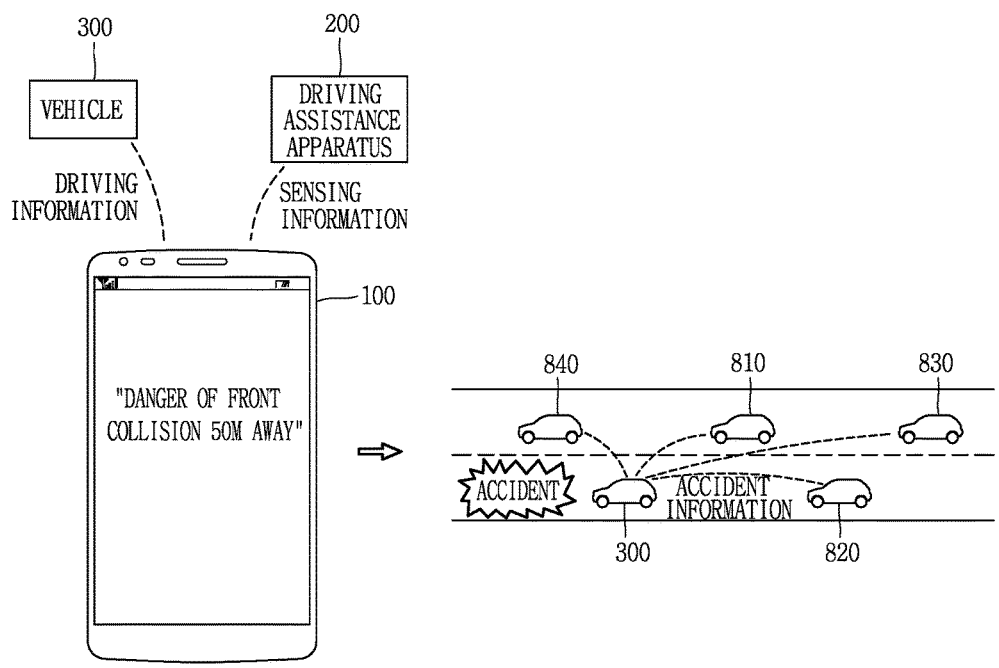
FIGS. 8A and 8B are conceptual views illustrating a control method of FIG. 7.
Figure 8B:
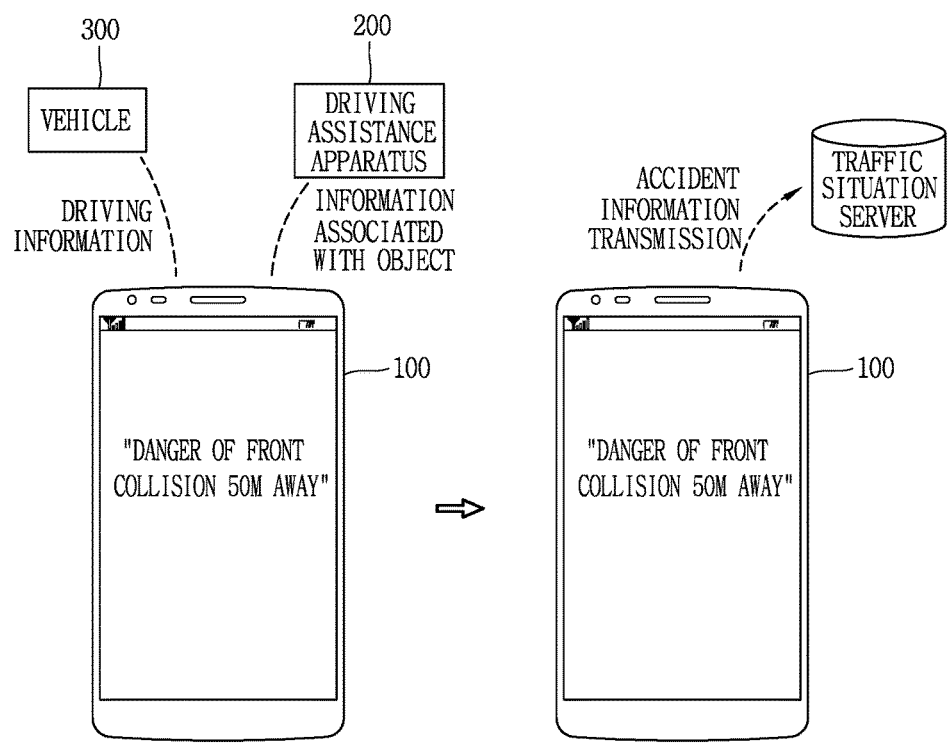

Hereinafter, when it is determined that there is a collision possibility, a method of notifying a nearby vehicle of it will be described. FIG. 7 is a flow chart illustrating a method of notifying a nearby vehicle of a collision possibility, and FIGS. 8A and 8B are conceptual views illustrating a control method of FIG. 7.

First, the controller 180 may determine a collision possibility of the vehicle as illustrated above in FIG. 5A. In other words, the controller 180 may receive information associated with the driving of the vehicle and information associated with an object located adjacent to the vehicle from one or more external devices (S710), and determine a collision possibility between the vehicle and the object based on the information associated with the driving of the vehicle and the information associated with an object located adjacent to the vehicle (S720).

Then, when it is determined that there is the collision possibility, the controller 180 may provide notification information indicating that there is the collision possibility to a nearby vehicle and a predesignated external device (S730). In other words, the controller 180 may notify that there is the collision possibility to a nearby vehicle and a preset external device, thereby preventing the occurrence of a chain collision accident.

The nearby vehicle may be a vehicle capable of performing communication with the vehicle 300 according to the present disclosure. Furthermore, the nearby vehicle may be a vehicle located within a preset range based on the vehicle 300. Here, a setting for receiving notification information in advance from the external vehicle may be set or reset by a user.

The nearby vehicle may be a vehicle located within a preset distance based on the vehicle 300. For example, the nearby vehicle may be a vehicle located within a radius of 1 km based on the location of the vehicle 300. The preset distance may be set by a user or set based on a preset condition. The preset condition may be set by at least one of a current location, a limit speed of a road, a state of a road surface, weather, and a speed of the vehicle. For example, the preset distance may be a radius of 1 km based on the vehicle on a sunny day, and a radius of 5 km based on the vehicle on a cloudy day.

For example, as illustrated in FIG. 8A, the controller 180 may transmit notification information for notifying a collision possibility to nearby vehicles 81, 820, 830, 840 located within a preset distance based on the vehicle 300. In this case, the notification information may be transmitted through the communication unit provided in nearby vehicles or transmitted to nearby vehicles through a vehicle connected with the mobile terminal through Bluetooth communication.

The predesignated external device may be a predesignated device such as a mobile terminal, a navigator, an external server or the like, as an electronic device capable of performing communication with the mobile terminal according to the present disclosure. For example, the predesignated external device may be a server of collecting traffic situations, a mobile terminal corresponding to a preset emergency contact in the memory unit, a government office server associated with traffic accident handling or the like. For example, as illustrated in FIG. 8B, the controller 180 may transmit an accident possibility to a traffic situation server for collecting traffic situations. In this case, the traffic situation server may transmit the accident possibility to another vehicle located in the vicinity.

For another example, the controller 180 may transmit a call signal to a mobile terminal corresponding to an emergency contact. The emergency contact may be set by a user of the mobile terminal, and may include a contact associated with accident handling such as a police, an insurance company, and the like.

Through this, the present disclosure may transmit a situation at a high risk of a traffic accident to a terminal associated with the traffic accident to perform rapid incident handling when the accident has occurred. The notification information may be provided in visual and auditory manners.

For example, the controller 180 may transmit the notification information to a predesignated mobile terminal to visually display information associated with a collision possibility on the display unit of the predesignated mobile terminal. In the above, a method of transmitting notification information for notifying a nearby vehicle and an external device of a collision possibility has been described.

Figure 9:
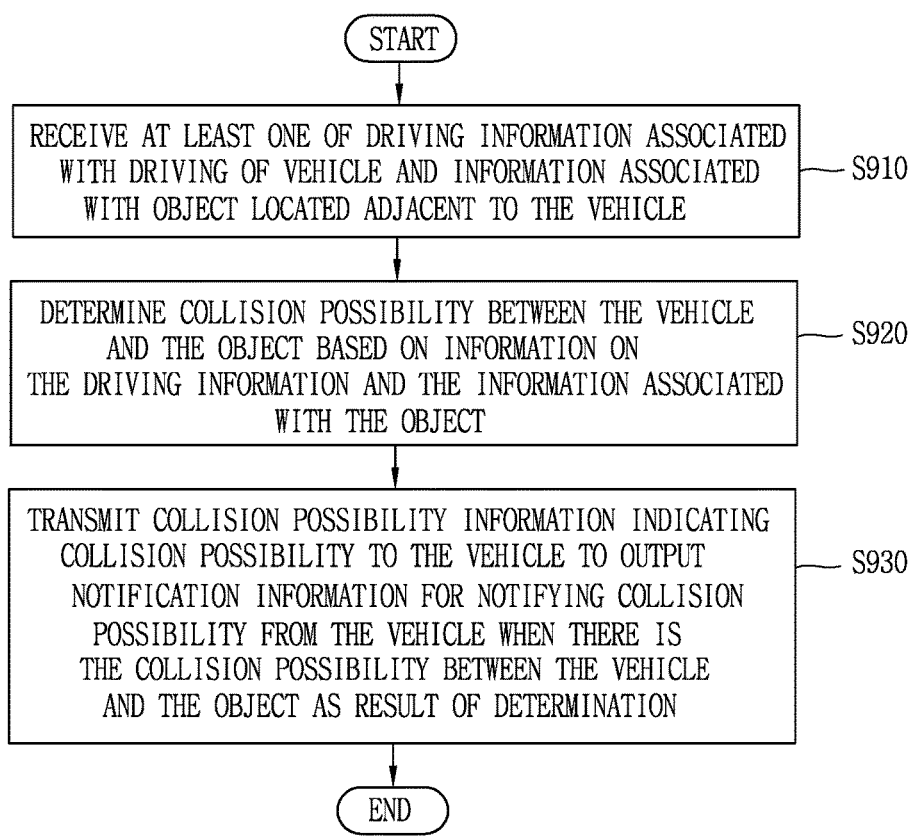
FIG. 9 is a flow chart illustrating a method of providing notification information using a vehicle when the vehicle has a collision possibility.

Hereinafter, a method of providing notification information using a vehicle when there is a collision possibility will be described in more detail with reference to the accompanying drawings. FIG. 9 is a flow chart illustrating a method of providing notification information using a vehicle when the vehicle has a collision possibility, and FIG. 10 is a conceptual view illustrating a control method of FIG. 9.

First, as illustrated above in FIG. 5A, the controller 180 may receive at least one of driving information associated with the driving of the vehicle and information associated with an object located adjacent to the vehicle to determine a collision possibility to determine a collision possibility (S910), and determine a collision possibility between the vehicle and the object based on the driving information and the information associated with the object (S920).

As a result of the determination, when there is a collision possibility between the vehicle and the object, the controller 180 may transmit collision possibility information indicating the collision possibility to the vehicle to output notification information indicating the collision possibility from the vehicle (S930).

The controller 180 may provide notification information for notifying a collision possibility to a user using the mobile terminal itself, and provide notification information for notifying a collision possibility to a user using at least one of the vehicle 300 and the driving assistance apparatus 200 that have transmitted the driving information. In this case, the controller 180 may provide notification information through the vehicle 300 and the driving assistance apparatus 200 to notify a driver of a nearby vehicle as well as a driver of the vehicle 300, thereby preventing a chain collision accident.

Figure 10A:
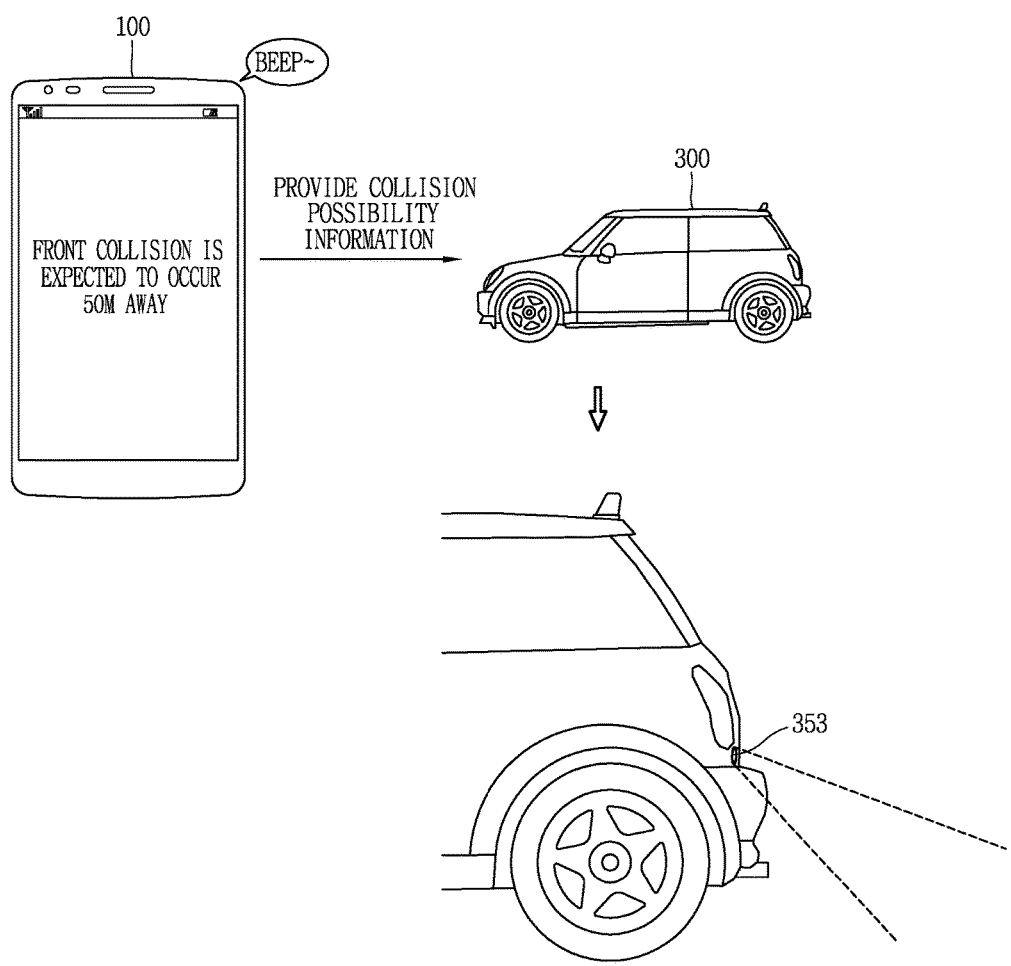
FIGS. 10A and 10B are conceptual views illustrating a control method of FIG. 9.

For example, as illustrated in FIG. 10A, the controller 180 may transmit the collision possibility to either one of the vehicle 300 and driving assistance apparatus 200, and either one of the vehicle 300 and driving assistance apparatus 200 that have received the collision possibility information may output light to provide notification information to a nearby vehicle through the light output unit.

Figure 10B:
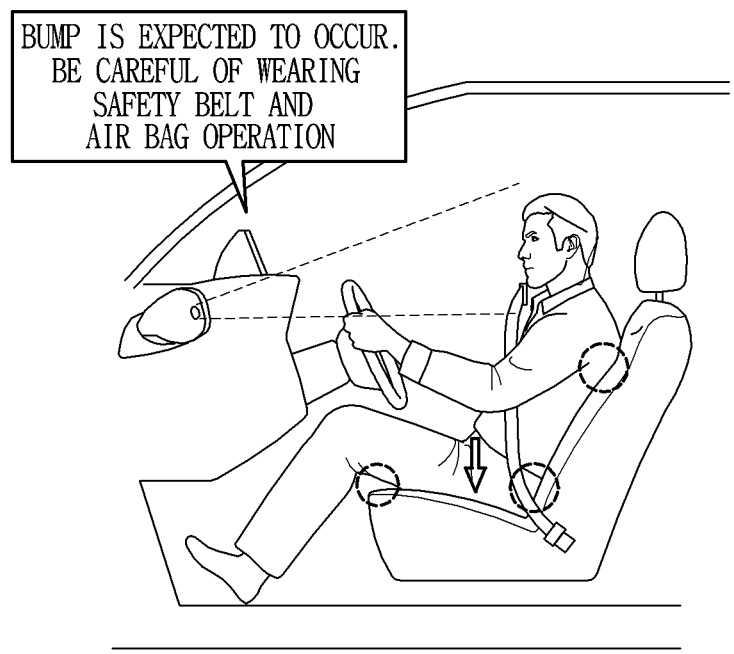

Here, the output location and output level of the light may be determined based on weather information, time information, posture information of a vehicle, a distance to a nearby vehicle or the like. For another example, as illustrated in FIG. 10B, the controller 180 may provide the collision possibility to a driver. In this case, the controller 180 may output light or provide voice information to the driver. Moreover, the controller 180 may control a driver's seat according to a degree of the collision possibility to minimize the driver's damage.

In the above, when it is determined that there is a collision possibility by the controller 180, a method of providing notification information through at least one of the vehicle 300 and driving assistance apparatus 200 has been described. However, contrary to the foregoing description, the vehicle or driving assistance apparatus 200 itself may determine a collision possibility, and provide notification information for notifying the collision possibility. In the following description, it will be described that the vehicle 300 and driving assistance apparatus 200 output notification information based on a mobile terminal that determines a collision possibility and provides notification information on the collision possibility, but may be also applicable in the same or similar manner to a case wherein the controller 320 of the vehicle 300 itself or the controller 220 of the driving assistance apparatus 200 itself determines a collision possibility and provides notification information.

Figure 11A:
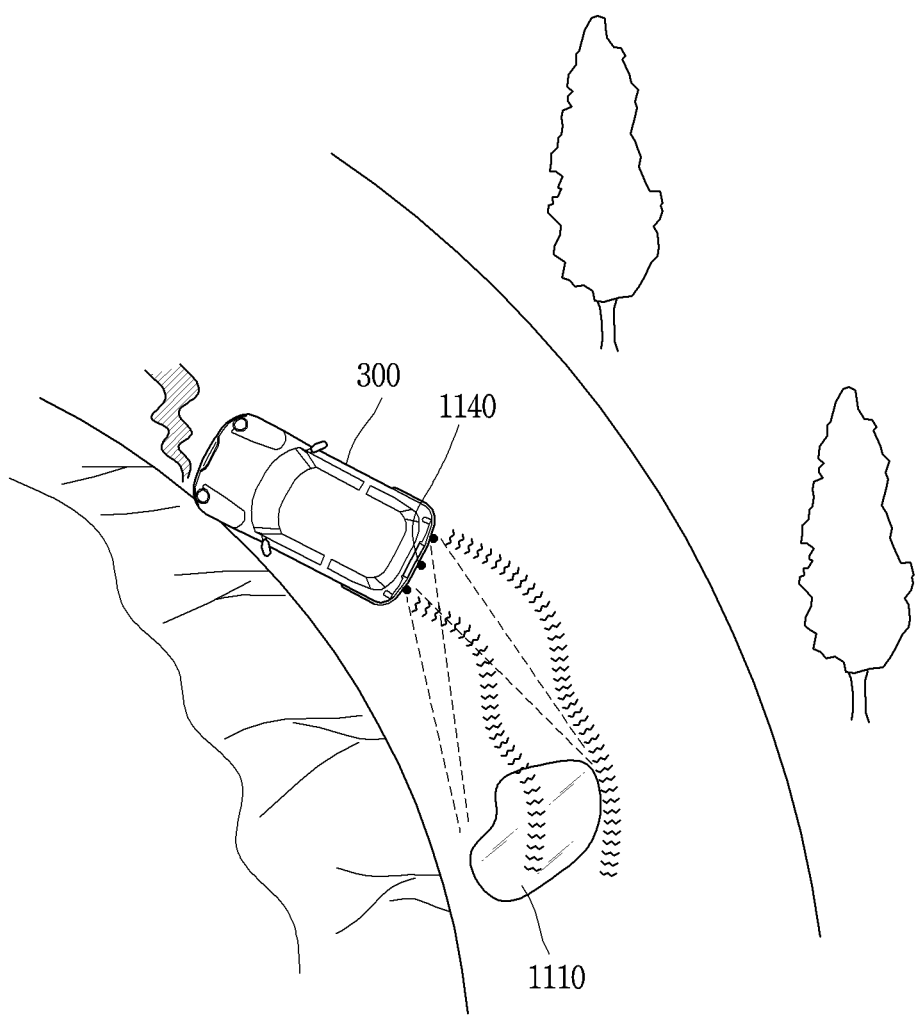
FIGS. 11A and 11B are conceptual views illustrating a method of providing notification information according to the surrounding environment of a vehicle.
Figure 11B:
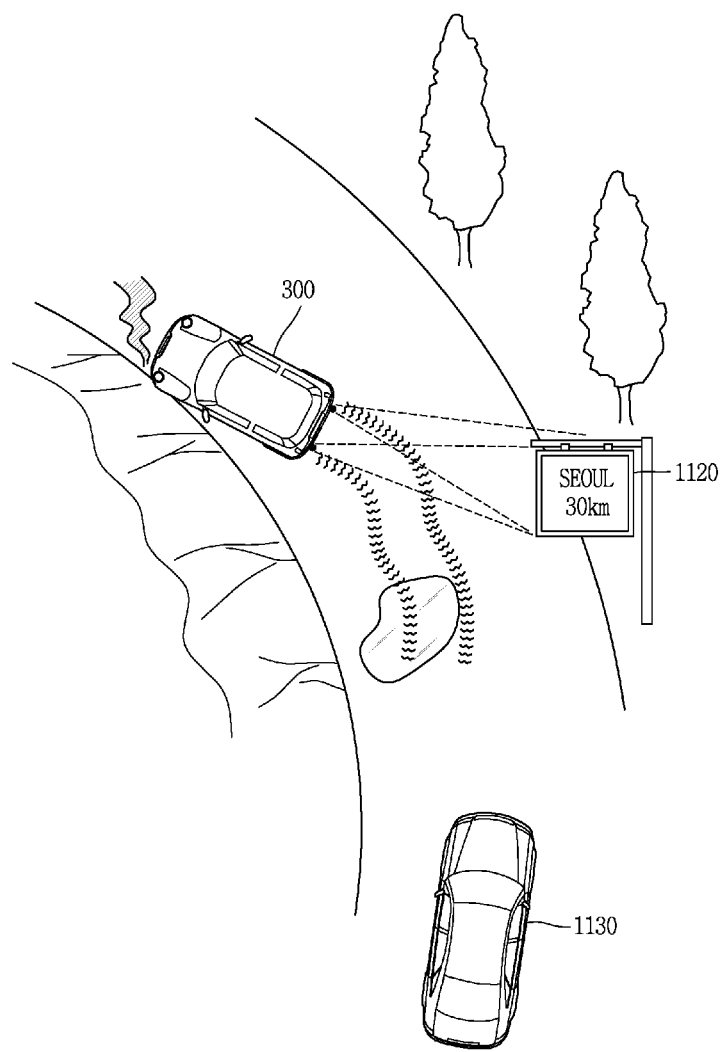
Figure 12A:
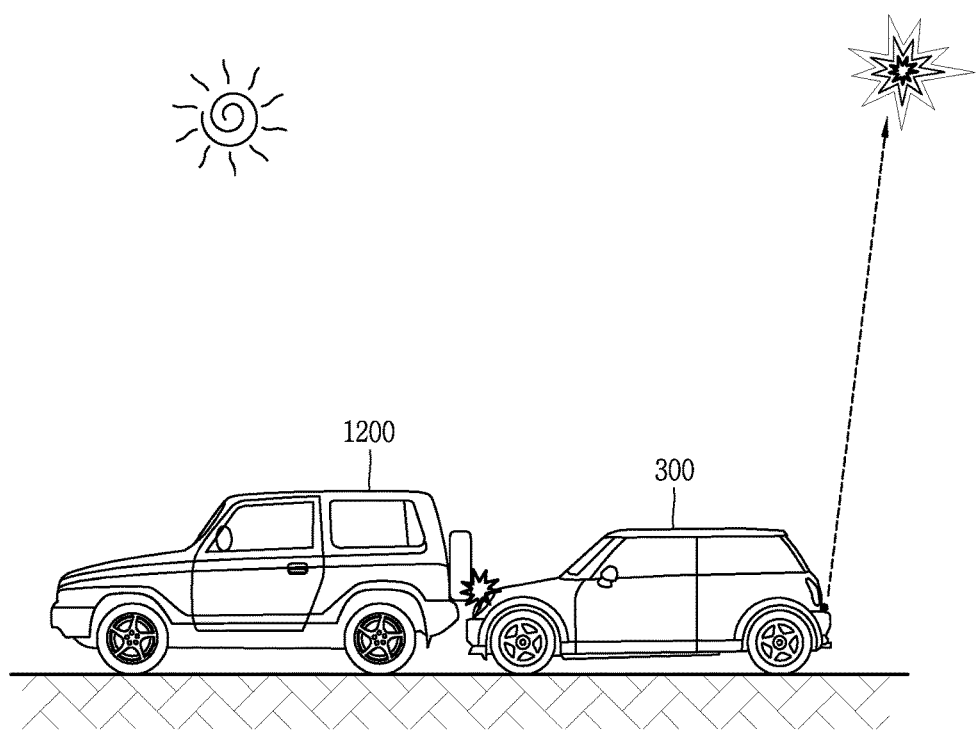
FIGS. 12A, 12B and 12C are conceptual views illustrating a method of providing notification information according to weather and time.
Figure 12B:
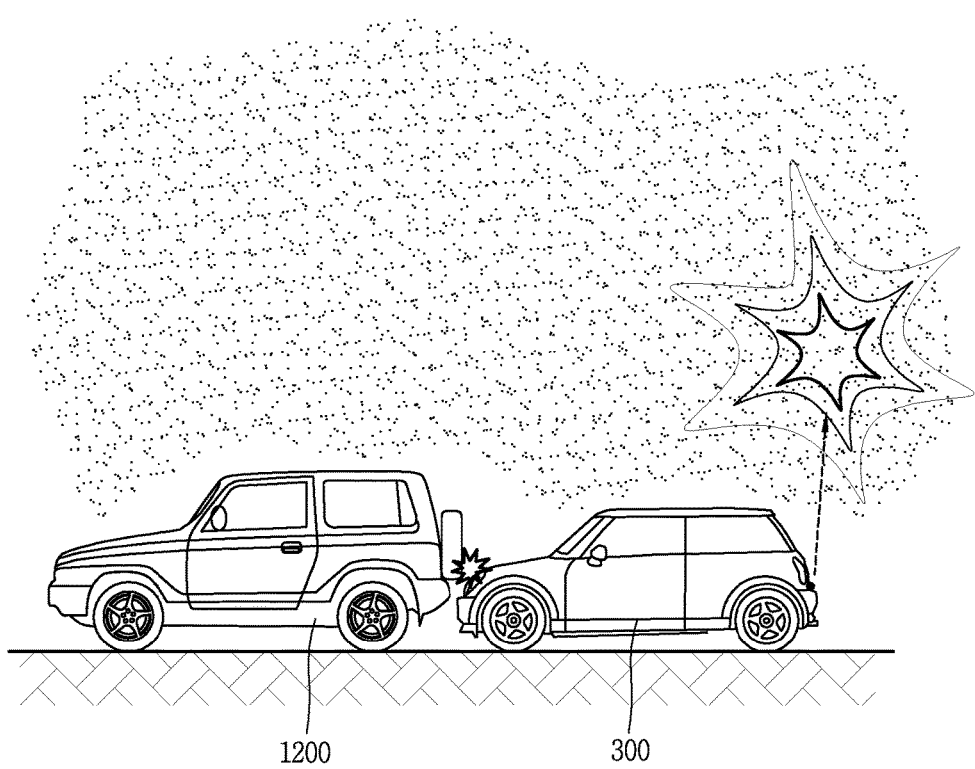
Figure 12C:
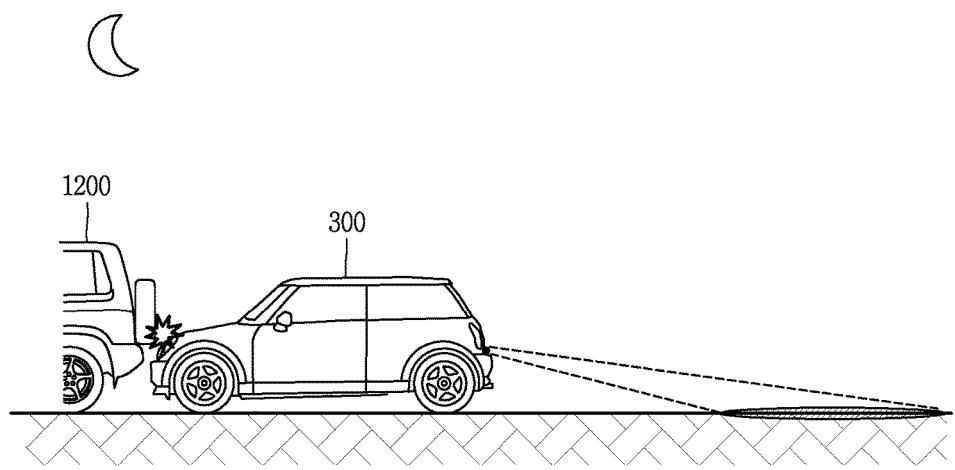

Hereinafter, a method of providing notification information when it is determined that there is a collision possibility will be described in more detail with reference to the accompanying drawings. FIGS. 11A and 11B are conceptual views illustrating a method of providing notification information according to the surrounding environment of a vehicle, and FIGS. 12A, 12B and 12C are conceptual views illustrating a method of providing notification information according to weather and time.

When it is determined that there is a collision possibility or a collision has occurred, the controller 180 may transmit information associated with the collision possibility to at least one of the vehicle 300 and driving assistance apparatus 200 to output notification information to the vehicle 300 and driving assistance apparatus 200. The information associated with the collision possibility may include information on both a case where there is a collision possibility and a case where a collision or impact has occurred.

Hereinafter, a method of transmitting information associated with a collision possibility to the vehicle 300 and driving assistance apparatus 200 from the mobile terminal will be described, but may be also applicable in the same manner to a case where the vehicle 300 and driving assistance apparatus 200 themselves determine a collision possibility.

Furthermore, the following description will be described based on the controller of the vehicle, but may be also applicable in the same manner to the controller of the driving assistance apparatus 200 and the controller of the mobile terminal. Here, the vehicle 300 that has received information associated with the collision possibility may output notification information indicating the collision possibility based on information associated with an object located adjacent to the vehicle 300. In other words, the vehicle may output notification information indicating the collision possibility in a different manner based on a shape of a road, whether or not there is a sign and the like.

More specifically, the controller 320 of the vehicle 300 may receive information associated with an object located adjacent to the vehicle 300 from the mobile terminal 100 or receive information associated with an object located adjacent to the vehicle 300 through the sensing unit provided in the vehicle 300 itself. The information associated with the object may include information on a shape of a road, an object in the vicinity of a road (for example, a sign, a street light, a tree or the like).

The controller 320 of the vehicle 300 may determine the output direction of light emitted from the light output unit 353 based on information associated with the object. In other words, the controller 320 of the vehicle 300 may set the output direction of light to allow light to reach a trailing vehicle in an appropriate manner according to a shape of a road.

For example, when it is detected that a road on which the vehicle 300 is currently located is a curved road, the controller 320 of the vehicle 300 may set the output path of light based on a curvature of the curved road. Here, the curvature is a unit indicating a degree of bending of a curved line or surface, and the characteristics of a curved road may be defined as a curvature. On the other hand, the characteristics of the curved road may be defined as a curvature radius, a road width, a road direction, and the like in addition to a curvature.

For example, as illustrated in FIG. 11A, when a curvature of the curved road is a first curvature, the controller 180 may set the output direction of the light to a first direction corresponding to the first curvature, and when a curvature of the curved road is a second curvature, the controller 180 may set the output direction of the light to a second direction corresponding to the second curvature. In other words, when light is outputted to the rear of the vehicle 300 on a curved road, the present disclosure may output light toward a vehicle in the rear.

On the other hand, when a curvature of the curved road has a curvature above a preset curvature or a vehicle located in the rear is not located within a preset range, the controller 320 of the vehicle 300 may irradiate light at a nearby object without illuminating light toward a vehicle located in the rear to allow a vehicle located in the rear to recognize light in a better way. In other words, when the curvature of the curved road is large, and thus light is unable to be recognized by a trailing vehicle even when light is irradiated on the road, the present disclosure may irradiate light to a nearby object to allow the trailing vehicle to recognize light reflected on the nearby object.

Furthermore, when a vehicle located in the rear is not located within a preset range, the vehicle may be unable to recognize light even though it is irradiated on the road, the present disclosure may irradiate light to a nearby object to allow a vehicle located in the rear to recognize light reflected on the nearby object. In other words, the nearby object may reflect light to assist the light to reach a more distant place.

In other words, when it is detected that a road on which the vehicle 300 is currently located is a curved road having a third curvature, and the third curvature is larger than a preset curvature, the controller 320 of the vehicle 300 may detect the location of nearby objects on information associated with the object.

Here, the controller 320 of the vehicle may detect an object such as a sign with a high reflectivity of light or a flat plate similar to a sign in the vicinity. Furthermore, the controller 180 may set the output direction of light emitted from the light output unit to irradiate light on the sign or flat plate. For example, as illustrated in FIG. 11B, the controller 320 of the vehicle 300 may irradiate light on a sign 1120 located adjacent to a curved road. At this time, a vehicle 1130 located in the rear may recognize a collision possibility through light irradiated on the sign.

Furthermore, when it is determined that the vehicle 300 is collided with an object or an accident due to a failure of the brake has occurred, the controller 320 of the vehicle may detect a cause point 1110 of the accident based on the driving information of the vehicle. More specifically, the controller 320 of the vehicle may detect a cause point of the accident based on the movement information and brake information of the vehicle body. For example, as illustrated in FIG. 11A, when a cause of the accident is due to the freezing of a road surface, the controller 320 of the vehicle may detect a point 1110 at which the road is frozen by the movement information and brake information of the vehicle body.

Here, the controller 320 of the vehicle outputs notification information on the cause point 1110 of the accident to allow a vehicle located in the rear to recognize the cause point of the accident. For example, as illustrated in FIG. 11A, the controller 320 may control the light output unit 353 to irradiate light on the cause point 1110 of the accident.

For another example, when a cause point of the accident is detected based on the movement information and brake information of the vehicle body, the controller 320 of the vehicle may spray a paint capable of visual display to the cause point 1110 of the accident. In this case, the vehicle 300 may further include a coloring unit 1140 including paint. A material for forming a solid layer on a surface of an object such as water-based paint, enamel or the like may be used for the paint. Through this, the present disclosure may allow a vehicle located in the rear to recognize a cause point 1110 of the accident (for example, a freezing point of a road), thereby preventing a secondary accident.

Furthermore, the controller 320 of the vehicle 300 may determine the color of the coated paint based on driving environmental information. The driving environmental information may be information exerting an effect on the driving of a driver such as weather information, time information and like. For example, the controller 320 of the vehicle 300 may coat a first color determined to be suitable for daytime when it is day time, and coat a second color determined to be suitable for night when it is night time. The coated color may be preset according to the driving environmental information.

In the above, a method of changing the output direction of light based on driving information and information on an object located in the vicinity has been described.

Hereinafter, when there is a collision possibility on the vehicle 300, a method of notifying a vehicle located in the rear of it will be described. FIGS. 12A, 12B and 12C are conceptual views illustrating a method of notifying a collision or impact to a vehicle located in the rear when a collision or impact is sensed on the vehicle.

When it is determined that there is a collision possibility or a collision has occurred, the controller 180 may transmit information associated with the collision possibility to at least one of the vehicle 300 and driving assistance apparatus 200 to output notification information to the vehicle 300 and driving assistance apparatus 200. The information associated with the collision possibility may include information on both a case where there is a collision possibility and a case where a collision or impact has occurred.

Hereinafter, a method of transmitting information associated with a collision possibility to the vehicle 300 and driving assistance apparatus 200 from the mobile terminal will be described, but may be also applicable in the same manner to a case where the vehicle 300 and driving assistance apparatus 200 themselves determine a collision possibility.

Furthermore, the following description will be described based on the controller of the vehicle, but may be also carried out in the same manner to the controller of the driving assistance apparatus 200 and the controller of the mobile terminal.

When it is determined that there is a collision possibility or the collision has occurred, the controller 320 of the vehicle 300 may output notification information associated with the collision possibility. Here, the controller 320 of the vehicle may output notification information in a different manner based on the surrounding environmental information of the vehicle. In other words, the present disclosure may determine the output color, output shape and output direction of notification information to allow a driver to recognize the notification information in a better way according to the characteristics in which the field of vision of vehicle drivers varies by the surrounding environmental information.

The surrounding environmental information may be received through a sensor provided in the vehicle 300 or received from an external device. For example, the vehicle 300 may receive surrounding environmental information from an external device through communication.

The surrounding environmental information may be information associated with the surrounding environment of the vehicle such as weather information, state information of a road surface, time information and the like. Here, the controller 320 of the vehicle 300 may determine at least one of the output direction of notification information and the output form of notification information based on the surrounding environmental information.

For example, since the view distance of vehicle drivers is long in case of clear daytime, the controller 320 of the vehicle 300 may provide notification information in a high and strong manner. For example, as illustrated in FIG. 12A, when a collision or impact between the vehicle 300 and the object 1200 has occurred during clear daytime hours, the controller 320 of the vehicle 300 may fire a light signal to an high altitude in an opposite direction to gravity.

At this time, the light output unit 353 may further include a flare (or emergency flame signal) for outputting a light signal. In other words, the controller 320 of the vehicle 300 may fire (or discharge, separate) the light signal unit from the vehicle 300 to fire light above a preset height. In this case, the flare can be recognized by a driver of a vehicle located far away to prevent a chain collision accident due to a vehicle located in the rear.

For another example, since the field of vision of vehicle drivers is short in case of a foggy day, the controller 320 of the vehicle 300 may output notification information suitable for fog. The notification information suitable for fog may output notification information using the property that light is scattered by moisture in the air due to fog. In other words, the controller 320 of the vehicle 300 may output a beam having a wavelength of light with the property of being well scattered by moisture in the air. For example, as illustrated in FIG. 12B, the controller 320 may output blue-based light with a short wavelength into fog. At this time, the outputted beam may be scattered by moisture in fog and light may be dispersed into a broad area. Through this, vehicles located in the rear may recognize light in a broad area to predict an accident point.

For still another example, since the view distance of vehicle drivers is not long in case of night, the controller 320 of the vehicle 300 may irradiate light on a road surface or output light above a predetermined height using the light signal unit. In other words, as illustrated in FIG. 12C, in case of night, the controller 320 of the vehicle 300 may irradiate light on a road to allow a driver in the rear to recognize a collision possibility.

In addition to the foregoing example, the controller 320 of the vehicle 300 may change the output direction of light or change the output intensity of light or provide notification information in a suitable manner to surrounding environment such as firing a light signal or the like. In the above, a method of providing notification information suitable to surrounding environment has been described.

Figure 13:
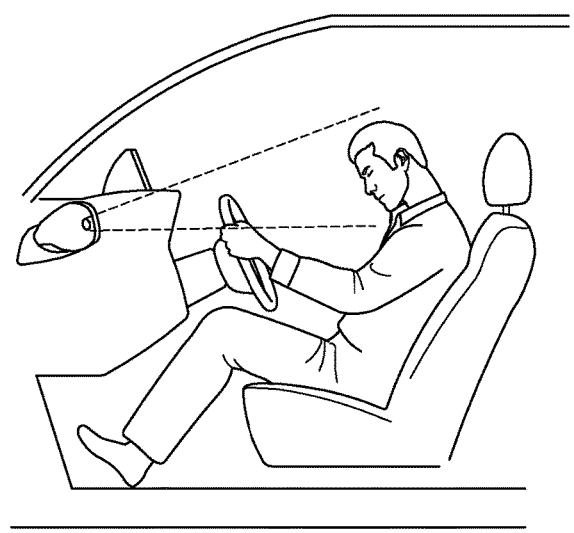
FIG. 13 is a conceptual view illustrating a method of providing notification information based on a user's status.
Figure 13:
Figure 13:
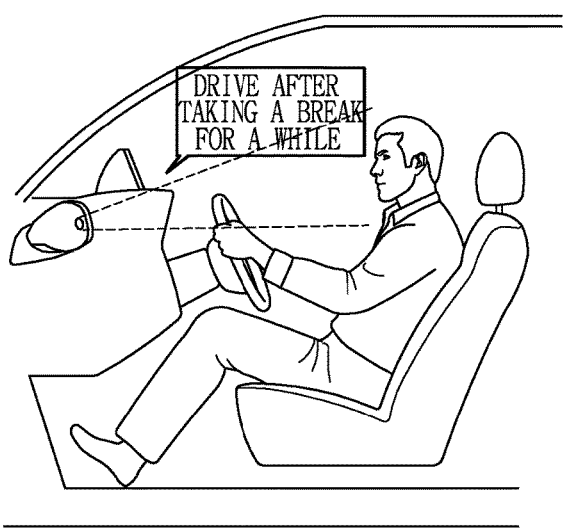

Hereinafter, a method of providing notification information based on a user's status will be described. FIG. 13 is a conceptual view illustrating a method of providing notification information based on a user's status. The controller 180 may receive driving information associated with the driving of the vehicle and information associated with an object located adjacent to the vehicle from one or more external devices, and determine a collision possibility between the object and the vehicle using it.

As a method different from the above mentioned method, the controller 180 may determine a driver's status to determine a collision possibility. The driver's status may be either one of a concentration state in which the driver concentrates on the driving of the vehicle and a non-concentration state in which the driver does not concentrate on the driving of the vehicle. Here, in case of the non-concentration state, the controller 180 may determine it as a collision possible state. For example, the non-concentration state may be a drowsy driving state in which a driver is drowsy, a state in which a driver concentrates on other things other than driving, and the like. The driver's status may be determined using technologies such as a driver's EEG analysis, a vehicle's movement analysis, and the like.

When it is determined that there is a collision possibility based on the driver's status, the controller 180 may provide notification for notifying the driver of it. In other words, when it is determined that a driver is in a non-concentration state, the controller 180 may provide notification information to induce a concentration state.

The notification information may be outputted through the audio output unit of the mobile terminal or through the light output unit 353 of the vehicle. For example, as illustrated in FIG. 13, when it is determined that there is a collision possibility based on the user in a non-concentration state, the controller 180 may transmit information associated with the collision possibility to the vehicle 300, and control the light output unit 353 disposed at a side mirror of the vehicle to irradiate light on the user based on information associated with the collision possibility. At this time, the present disclosure may irradiate light on a user's upper face other than his or her front face not to prevent the driving of a user who is driving the vehicle. Furthermore, light irradiated on a side of the user may use yellow-based light not to cause glare. Furthermore, the controller 320 of the vehicle 300 may output a notification voice of "please drive after taking a break for a while" along with the light.

In the above, a method of determining a collision possibility according to a driver's status, and providing notification information on the collision possibility has been described. Through this, the present disclosure may prevent a traffic accident from occurring due to carelessness such as a driver's drowsy driving or the like in advance.

Figure 14A:
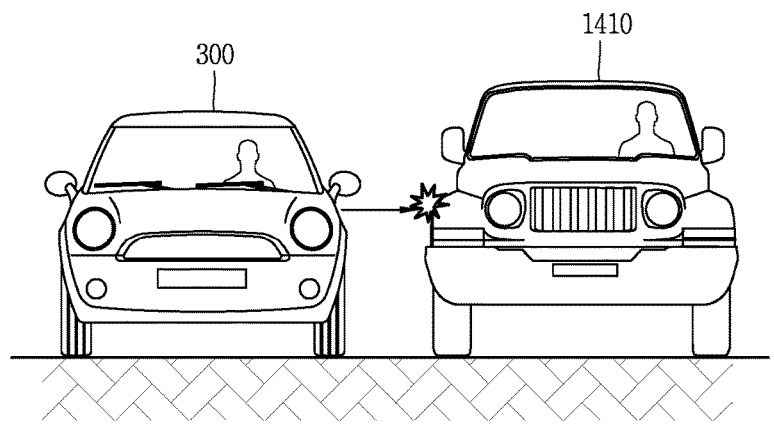
FIGS. 14A and 14B are conceptual views illustrating a method of notifying a case where there is a collision possibility with the side and rear of a vehicle.
Figure 14A:
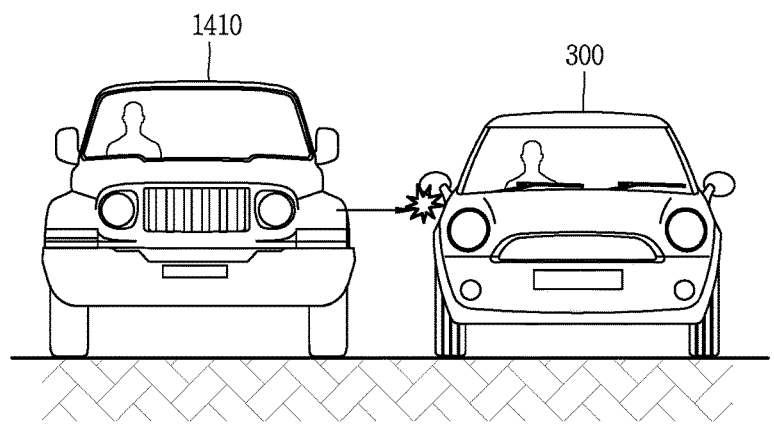
Figure 14A:
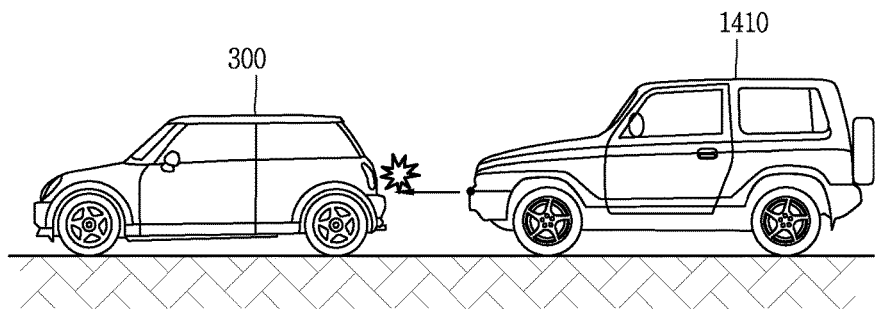
Figure 14B:
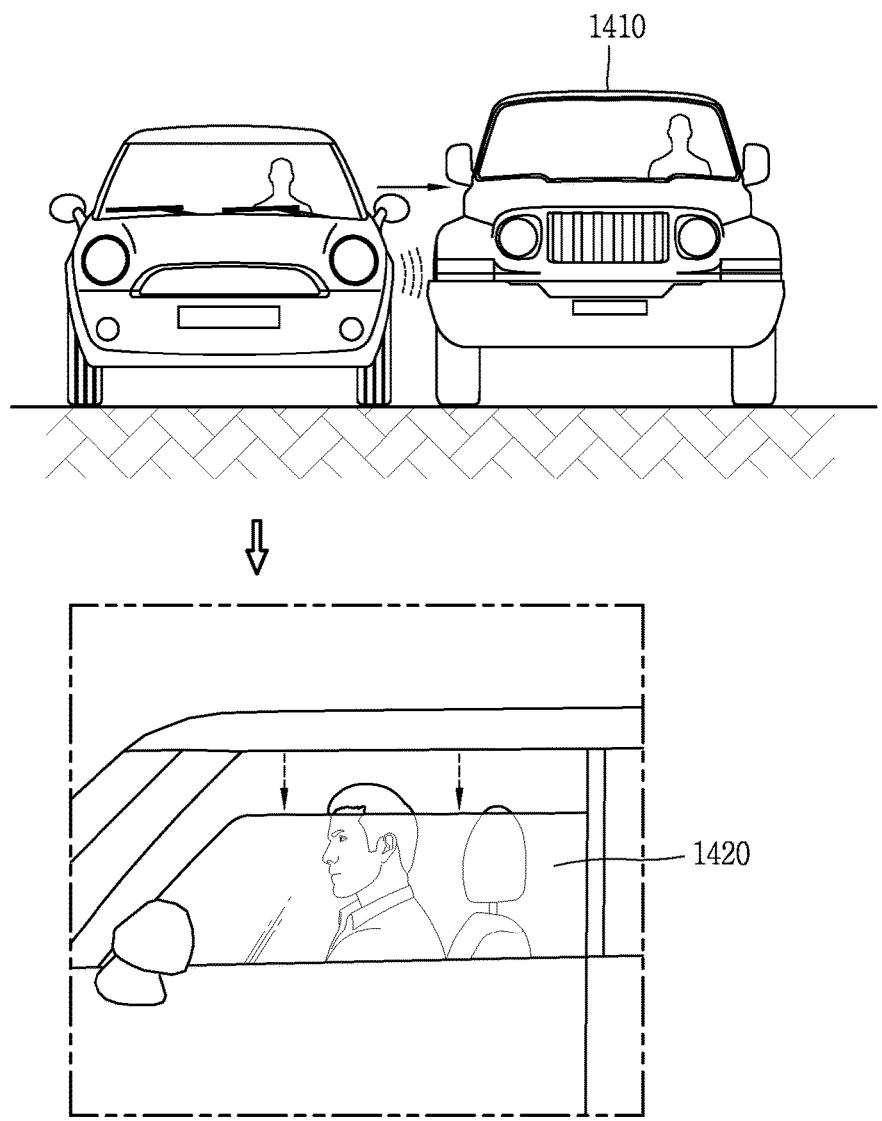

Hereinafter, when there is a collision possibility to the side and rear of a vehicle, a method of notifying it will be described. FIGS. 14A and 14B are conceptual views illustrating a method of notifying a case where there is a collision possibility with the side and rear of a vehicle.

When there is a collision possibility with an object with respect to any one of the side and rear of the vehicle 300, contrary to a case of the front, a driver of the vehicle may turn his or her head or check an object with the collision possibility through a mirror mounted on the vehicle. In other words, in case of an object being collided with the side and rear of the vehicle 300, the inducement of an additional user's line of view is required to recognize it.

As a result, in order to induce a user's line of view, the controller 180 may provide a notification from a different location according to which side of the vehicle 300 the object approaches from. In other words, the controller 180 may provide notification information to a location required for the inducement of a user's line of view to induce the user's line of view.

As illustrated in FIG. 14A, the controller 180 may sense a case where the object 1410 has a possibility to be collided with the right side of the vehicle 300, a case where the object 1410 has a possibility to be collided with the left side of the vehicle 300 and a case where the object 1410 has a possibility to collide with the rear of the vehicle 300.

In this case, the controller 180 may output notification information from a different location according to which side of thereof the object is collided with. More specifically, the controller 180 may output notification information through the output unit located at a side from which the collision of the object is expected to induce a driver's line of view to the side from which the collision is expected.

The notification information may be outputted in visual, auditory and tactile manners. For example, as illustrated in the lower drawing of FIG. 14B, when there is a possibility of an object approaching the right side based on the front of the vehicle, the controller 180 may transmit information associated with the possibility of approaching the vehicle.

The controller 320 of the vehicle 300 may move a window in the right side in response to information associated with the approaching possibility being received to induce a user's line of view to the right. Similarly, it may be possible to move a window in the left side in case of the left side, and move both windows at the same time in case of the rear. Through this, the user may recognize the location of an object he or she is approaching, and avoid it.

In the above, when there is a collision possibility in the rear and the side in addition to the front of the vehicle, a method of notifying a user of it has been described.

Figure 15:
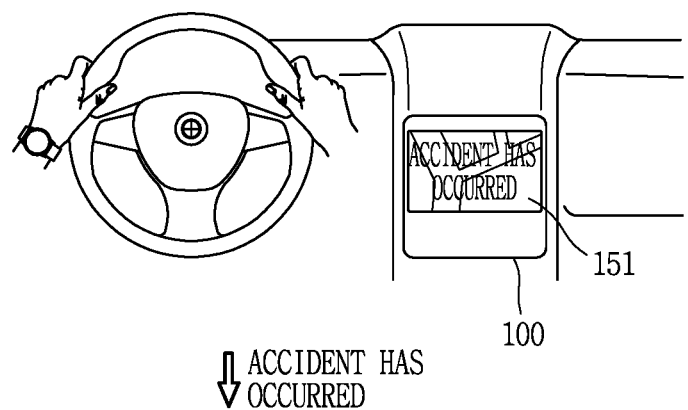
FIG. 15 is a conceptual view illustrating a method of providing notification information to a user through a watch type terminal.
Figure 15:

Hereinafter, a method of providing notification information to a user through a watch type terminal will be described. FIG. 15 is a conceptual view illustrating a method of providing notification information to a user through a watch type terminal.

When it is determined that there is a collision possibility, the controller 180 may transmit notification information for notifying that there is a collision possibility to a watch type terminal capable of near field communication. The watch type terminal is formed to be worn on a user's wrist, and directly in contact with a user's skin. As a result, upon receiving notification information for notifying that there is the collision possibility, the watch type terminal may provide notification information for notifying that there is the collision possibility in at least one of visual, tactile and auditory methods to the user.

For example, the watch type terminal may display an avoidance location for avoiding a collision with an object on the display unit of the watch type terminal, and vibrate the body. Furthermore, the watch type terminal may output an alarm sound at the same time. Through this, the user may provide notification information through a watch type terminal as well as a mobile terminal.

Figure 16A:
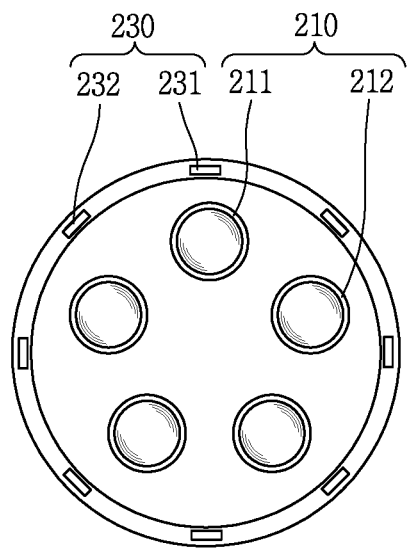
FIGS. 16A and 16B are structural diagrams illustrating the structure of lamps and sensors in a driving assistance apparatus according to the present disclosure.
Figure 16B:
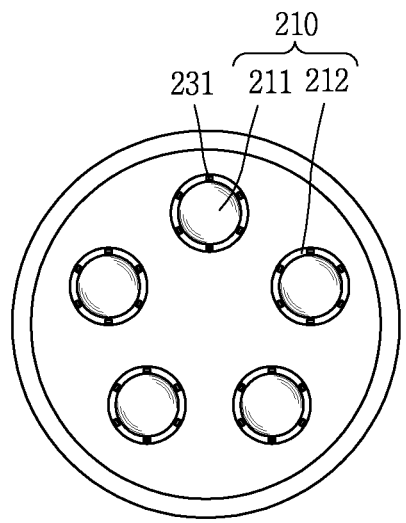
Figure 17A:
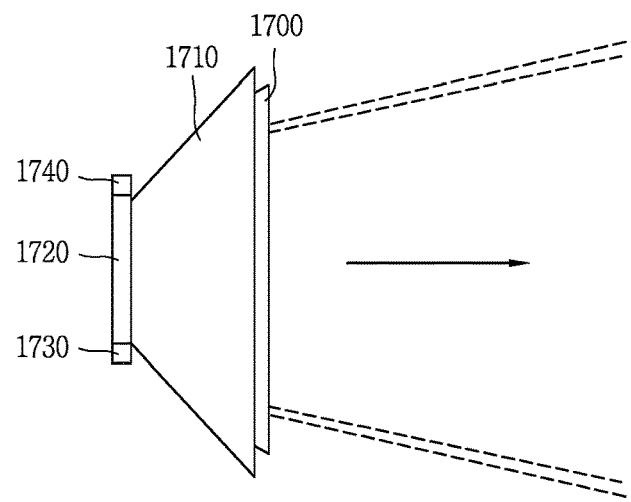
FIGS. 17A, 17B and 17C are structural diagrams illustrating the structure of lamps in a driving assistance apparatus according to the present disclosure.
Figure 17B:
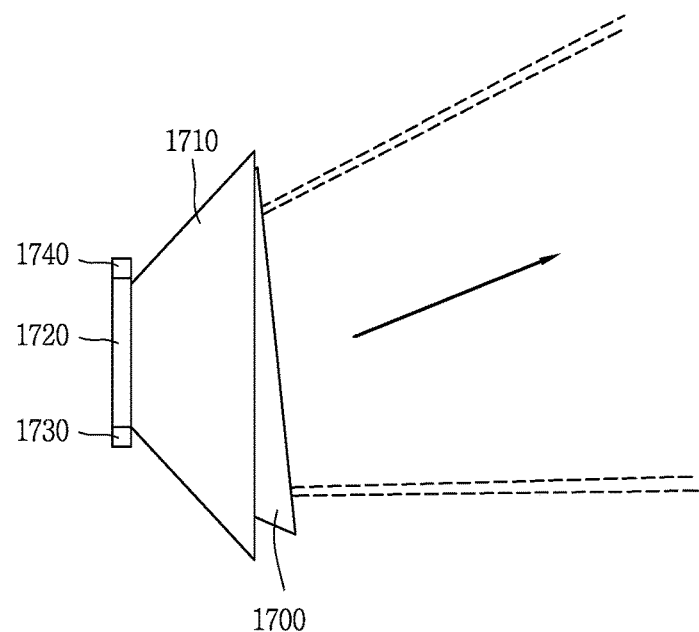
Figure 17C:
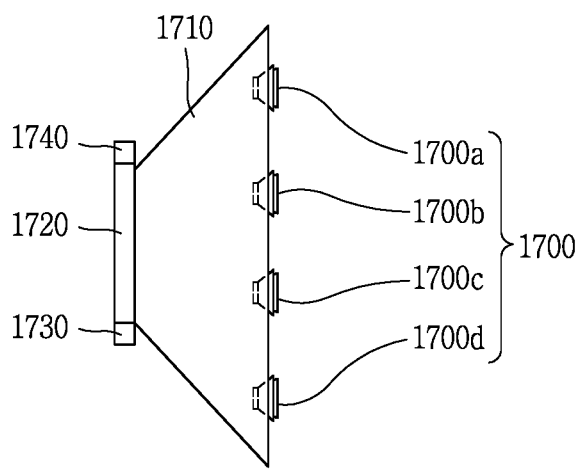

Hereinafter, the structure of a driving assistance apparatus will be described with reference to the accompanying drawings. FIGS. 16A and 16B are structural diagrams illustrating the structure of lamps and sensors in a driving assistance apparatus according to the present disclosure. FIGS. 17A, 17B and 17C are structural diagrams illustrating the structure of lamps in a driving assistance apparatus according to the present disclosure.

The driving assistance apparatus 200 according to the present disclosure may include at least one of a light output unit 210, a sensor unit 230, a controller 220, a relay unit 250, a wireless communication unit 260 and a power supply unit 240. The driving assistance apparatus 200 may be formed in a circular shape, and disposed at least one or more of a front/rear bumper, a front grill and a side portion of the vehicle.

The light output unit 210 may be formed to output light, and configured with a plurality of lamps 211, 212. The sensor unit 230 may be formed to sense an object located adjacent to the vehicle, and configured with at least one or more sensors. For example, referring to FIG. 16A, the light output unit 210 may be configured with a plurality of lamps 211, 212, and the sensor unit 230 may be also formed with a plurality of sensors 231, 232.

Here, the sensor unit 230 may be disposed to surround an outer region of the driving assistance apparatus 200. In this case, the driving assistance apparatus 200 may receive sensing information on an object through individual sensors for each lamp 211, 212.

For another example, referring to FIG. 16B, the sensor unit 230 may be disposed to surround an outer region of each lamp 211, 212. In this case, the driving assistance apparatus 200 may receive sensing information on an object through individual sensors for each lamp 211, 212.

Furthermore, the driving assistance apparatus 200 may have a structure in which the light output unit 210 is tilted to change the output direction of light. For example, FIGS. 17A and 17B are side views illustrating a lateral surface of the driving assistance apparatus 200.

The driving assistance apparatus 200 may include a lamp support portion 1700 for supporting a lamp, a body 1710 for surrounding the lamp support portion, a coupling portion 1720 coupled to an external device, a battery 1730 and a light signal unit 1740.

The lamp may be configured to be placed on the lamp support portion 1700. The lamp support portion 1700 may be configured with a rotatable structure to change the output direction of light irradiated from the lamp. In other words, the lamp support portion 1700 may be tilted to change the output direction of light irradiated from the lamp. On the other hand, the rotation or tilting of the lamp support portion 1700 may be carried out based on the control of the controller (for example, the controller 220 of the driving assistance apparatus 200).

Furthermore, though not shown in the drawing, the lamp support portion 1700 may include one surface and the other surface, and a lamp may be disposed on the one surface. Moreover, a design element (for example, logo, brand name, specific image, etc.) may be disposed on the other surface of the lamp support portion 1700.

Accordingly, the lamp support portion 1700 may be configured such that the other surface disposed with a design element is exposed to an outside thereof when there is no collision possibility, and the lamp support portion 1700 may be configured to such that one surface disposed with a lamp is exposed to an outside thereof when there is a collision possibility. According to the present invention, when there is a collision possibility, light may be irradiated through a lamp disposed on the one surface to output notification information to an outside.

The body 1710 may be formed to surround an outer circumferential surface of the lamp support portion 1700 to perform the role of protecting the lamp support portion 1700. The coupling portion 1720 may be formed to be coupled to an external device. For example, the coupling portion 1720 may be formed to be mounted on a front grill of the vehicle 300.

The coupling portion 1720 may tilt the lamp support portion 1700 by the controller of an external device and the controller of the driving assistance apparatus 200 itself to change the output direction of light. For example, the controller 220 of the driving assistance apparatus 200 may tilt the lamp support portion 1700 to fire light in the air in an opposite direction to gravity when there is a danger of the occurrence of a collision accident of the vehicle 300 or a collision accident has occurred.

On the other hand, the driving assistance apparatus 200 may change the output direction of light of a plurality of lamps constituting the lamp support portion 1700 at the same time, but each lamp may have a different output direction. When each lamp has a different output direction, each lamp constituting the lamp support portion 1700 may have a separate lamp support portion for each lamp to be tilted. For example, as illustrated in FIG. 17C, each lamp may have the lamp support portion 1700, respectively.

Here, the controller of the driving assistance apparatus 200 or the controller of an external device (for example, vehicle or mobile terminal) may set a different output direction for each lamp to tilt the lamp support portion 1700 to have each output direction. Through this, the present disclosure may output light with various directions.

Figure 18A:
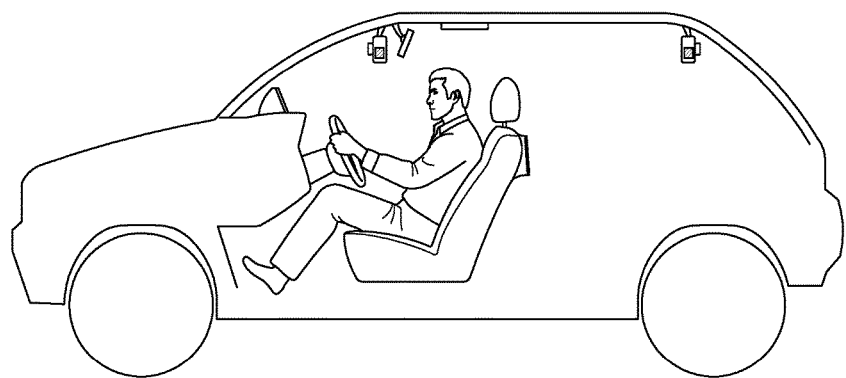
FIGS. 18A and 18B are conceptual views illustrating a location on which a driving assistance apparatus is mounted within a vehicle.
Figure 18B:
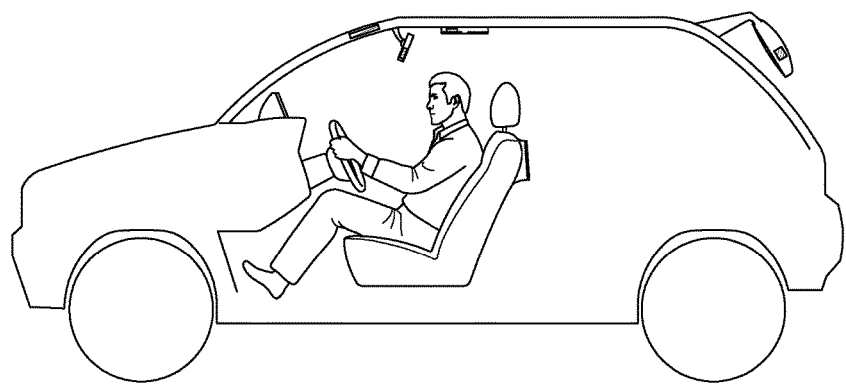
Figure 19A:
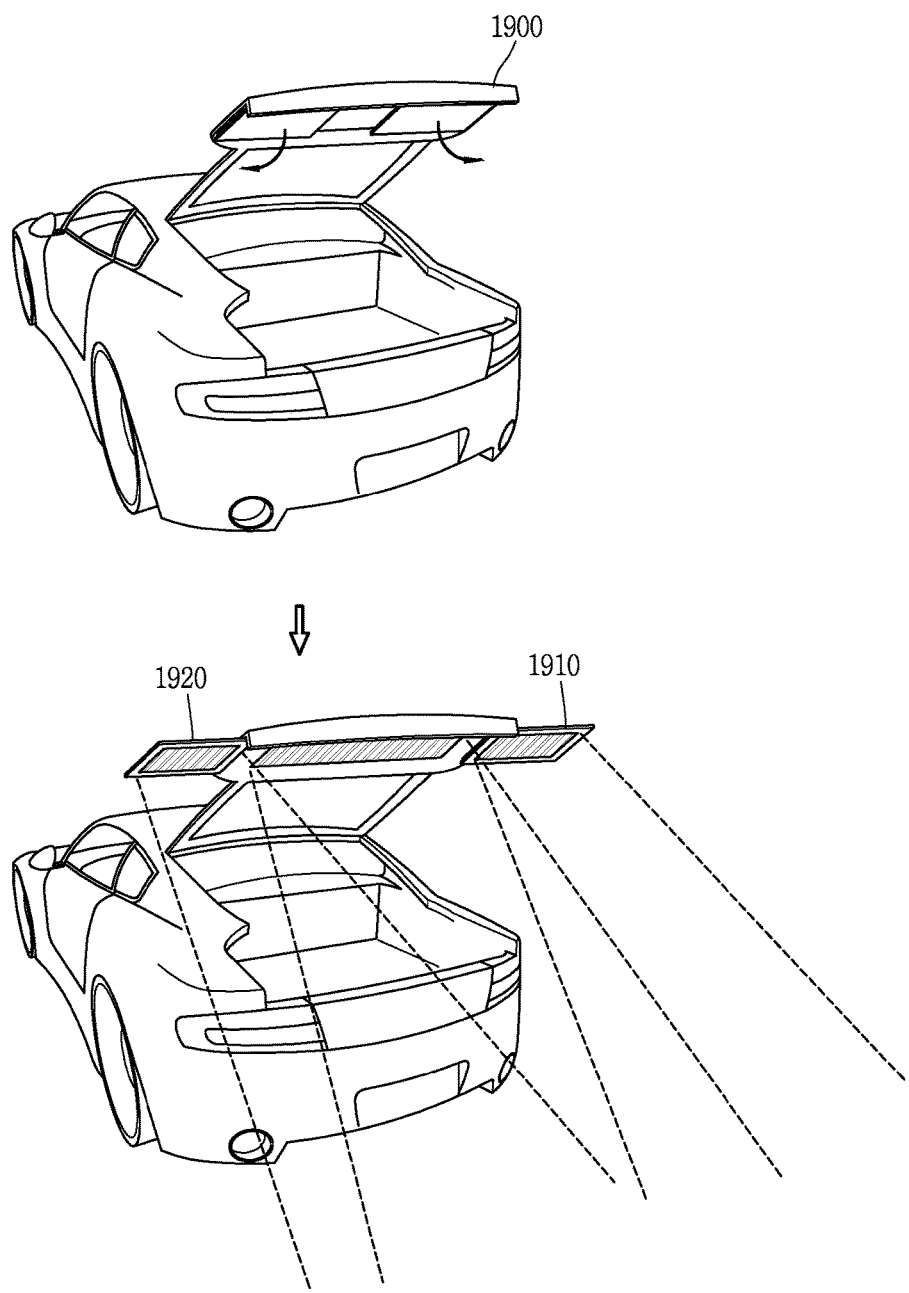
FIGS. 19A and 19B are conceptual views illustrating an example in which a driving assistance apparatus is mounted on a trunk lid.
Figure 19B:
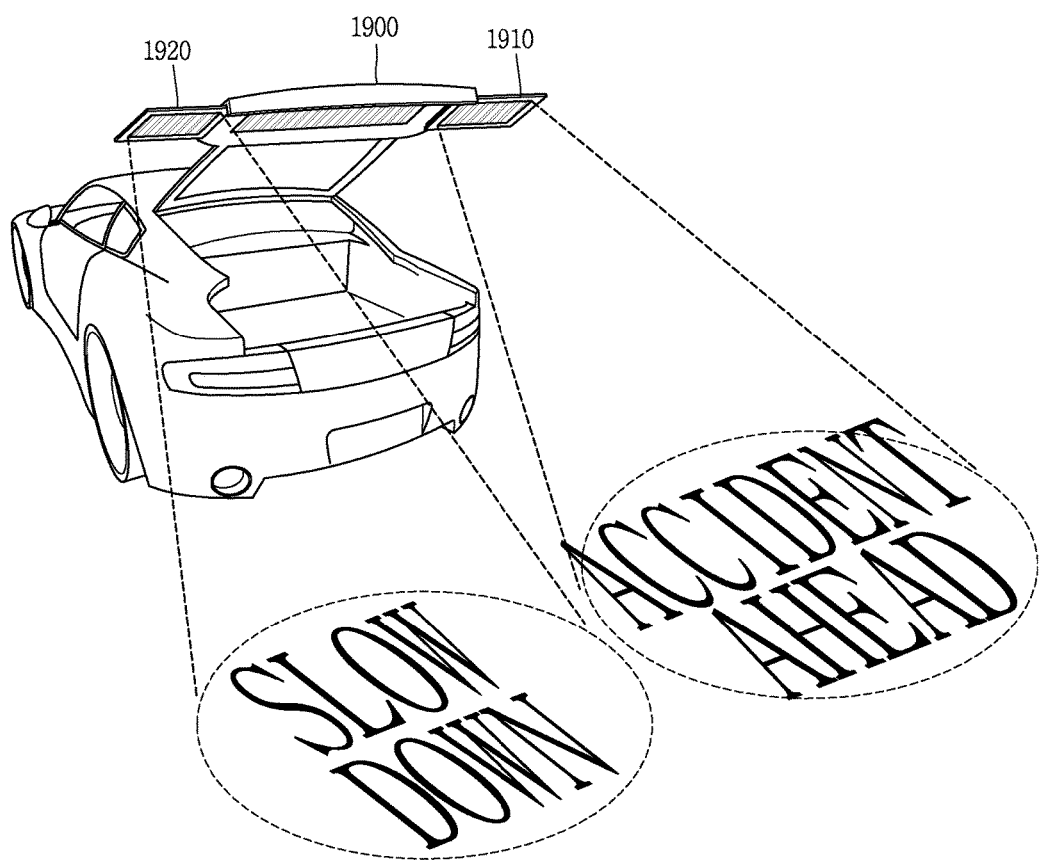

In the above, the configuration of changing the output direction of light of the light output unit of the driving assistance apparatus has been described. Hereinafter, a location on which the driving assistance apparatus can be mounted will be described. FIGS. 18A and 18B are conceptual views illustrating a location on which a driving assistance apparatus is mounted within a vehicle, and FIGS. 19A and 19B are conceptual views illustrating an example in which a driving assistance apparatus is mounted on a trunk lid.

The driving assistance apparatus 200 may be disposed on an outer circumferential surface of the vehicle, and disposed such that the output direction of light outputted from the light output unit 210 is directed toward an outside or inside of the vehicle or disposed within the vehicle, and disposed such that the output direction of light outputted from the light output unit 210 is directed toward an inside of the vehicle.

For example, as illustrated in FIGS. 18A and 18B, the driving assistance apparatus 200 may be disposed on a front black box or rear black box provided within the vehicle or disposed on a room mirror, a front glass, a room lighting, a rear mirror, and the like. When the output direction of light is disposed toward an inside of the vehicle, the driving assistance apparatus 200 may provide notification information in such a manner that the output direction of light is directed toward a driver using light. For example, when it is determined that a driver is in a drowsy driving state, the driving assistance apparatus 200 may output light toward the driver.

Furthermore, the driving assistance apparatus 200 may irradiate strong light to an inside of the vehicle, thereby notifying a vehicle located in the rear of an emergency situation. On the other hand, the driving assistance apparatus 200 may be disposed on a trunk lid 1900. The trunk lid 1900 may denote a lid of a trunk disposed in the rear of the vehicle 300, and configured to with an opening and closing structure.

When the trunk lid 1900 is disposed on the trunk lid 1900, the trunk lid 1900 may be automatically open when there is a collision possibility for the vehicle 300 or a collision or impact has occurred. In other words, the driving assistance apparatus 200 may be formed such that the trunk lid 1900 is automatically open to output light to an outside when there is a collision possibility of the vehicle 300 or a collision or impact has occurred.

More specifically considering the structure of the driving assistance apparatus 200, as illustrated in FIG. 19A, the driving assistance apparatus 200 may be configured such that an auxiliary light output unit 1910 and 1920 is connected to the trunk lid 1900 in a relatively rotatable manner. For the connection, a hinge portion (not shown) may be formed between the auxiliary light output unit 1910 and 1920 and the trunk lid 1900.

The hinge portion may include a hinge shaft (not shown) rotatably mounted on the trunk lid 1900, and the auxiliary light output unit 1910 and 1920 may be connected to the hinge shaft. The hinge shaft may be connected to a drive unit (for example, a motor, not shown) for adding a rotational force to the auxiliary light output unit 1910 and 1920, and the drive unit may be controlled by the controller 220 of the driving assistance apparatus 200 or the controller 320 of the vehicle 300.

In other words, the driving assistance apparatus 200 may include the light output unit 210 having the auxiliary light output unit 1910, 1920 configured with a hinge structure capable of moving in a horizontal or vertical direction. Here, when there is a collision possibility or a collision or impact has occurred, the driving assistance apparatus 200 may irradiate light while the auxiliary light output unit 1910, 1920 formed with the hinge structure is open to the left or right. In other words, when there is a collision possibility of the vehicle or a collision or impact has occurred, the driving assistance apparatus 200 according to the present disclosure may unfold the light output unit 210 and auxiliary light output unit 1910, 1920 of the driving assistance apparatus 200 while opening the trunk lid 1900.

For example, as illustrated in FIG. 19B, the driving assistance apparatus 200 may irradiate light including a notification text while unfolding the light output unit 210. Here, a notification text may be engraved on the light output unit 210 and auxiliary light output unit 1910, 1920 to display the notification text while irradiating light.

Figure 20:
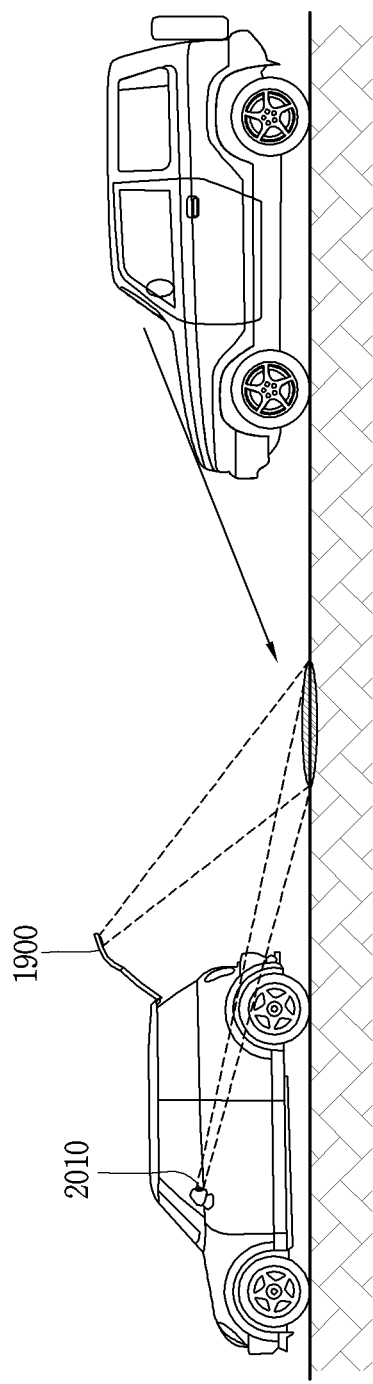
FIG. 20 is a conceptual view illustrating a method of controlling a plurality of driving assistance apparatuses.

As a result, according to the present disclosure, an area on which light is outputted increases by the unfolding of the light output unit 210, and thus an irradiation dose of light increases to irradiate a large amount of light. Through this, the present disclosure may irradiate a large amount of light at a time in an emergency situation, thereby notifying a nearby vehicle of an emergency situation in a more accurate manner. Furthermore, a plurality of driving assistance apparatuses 200 may be disposed on the vehicle. For example, as illustrated in FIG. 20, the driving assistance apparatus 200 may be disposed on a side mirror 2010 and a trunk lid 1900 of the vehicle 300.

When there are the plurality of driving assistance apparatuses 200, the vehicle 300 or mobile terminal 100 according to the present disclosure may select and use any one of the plurality of driving assistance apparatuses 200 or use at least two of them at the same time. Here, a preset condition may be a condition associated with a state of a road surface, weather, time, a location of a nearby vehicle, driving information, and the like.

On the other hand, when at least two driving assistance apparatuses 200 are used at the same time, the vehicle 300 or mobile terminal 100 according to the present disclosure may control the at least two driving assistance apparatuses 200 to irradiate light to the same location or irradiate light to different locations. For example, as illustrated in FIG. 20, the vehicle 300 or mobile terminal 100 may control driving assistance apparatuses located on the side mirror 2010 and trunk lid 1900 to irradiate light to the same location. When light is irradiated to the same location as described above, light with a higher intensity of light may be irradiated, thereby allowing a driver of a trailing vehicle to easily know an emergency situation.

In the above, a method of controlling a plurality of driving assistance apparatuses has been described. Meanwhile, the present disclosure may be also applicable in the same manner to a case where the driving assistance apparatus is separately mounted and operated and a case where a plurality of light output units are provided in the vehicle by itself.

Figure 21:
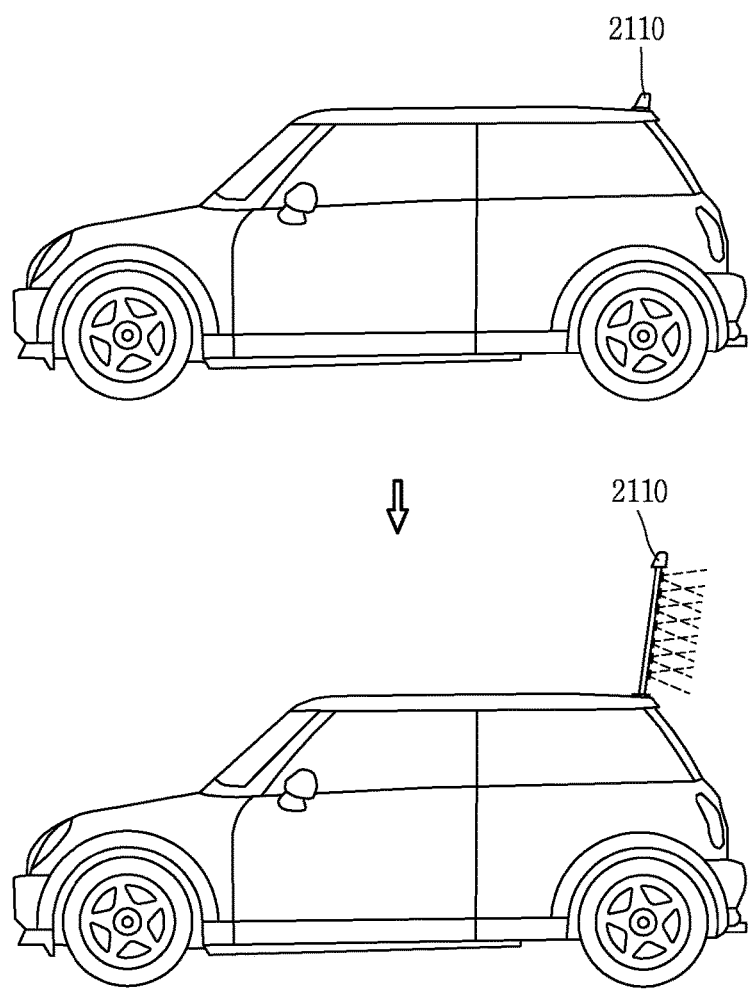
FIG. 21 is a conceptual view illustrating another structure of a light output unit provided in a driving assistance apparatus or vehicle.

Hereinafter, another structure of a light output unit provided in a driving assistance apparatus or vehicle will be described. FIG. 21 is a conceptual view illustrating another structure of a light output unit provided in a driving assistance apparatus or vehicle.

The light output unit provided in the driving assistance apparatus 200 or vehicle 300 according to the present disclosure may have various shapes. For example, as illustrated in FIG. 2B, the light output unit may have a circular shape, and attached to or detached from the vehicle. For another example, as illustrated in FIG. 21, the light output unit 210 may be configured in a rod shape to be withdrawn from the body of the vehicle 300. Here, as illustrated in FIG. 21, when the light output unit 210 is withdrawn from the body of the vehicle 300, a plurality of lamps may be formed on the rod of the light output unit 210 to output light. Through this, the present disclosure may include a plurality of lamps for outputting light to irradiate light with a higher intensity than that of the related art. Accordingly, the present disclosure may effectively provide notification information even in a situation such as fog or the like in which a driver's view distance decreases.

The present disclosure may estimate a collision possibility of a vehicle based on the driving information of the vehicle and information associated with an object located adjacent to the vehicle, and provide notification information for notifying a driver of the vehicle and a driver of a nearby vehicle. Through this, the present disclosure may prevent a chain collision accident due to a vehicle located in the rear even when a collision accident of the vehicle occurs.

Furthermore, the present disclosure may predict a collision possibility, and transmit it to at least one of a vehicle and a driving assistance apparatus, thereby providing a driver of the vehicle and a driver of a nearby vehicle. Through this, the present disclosure may provide a method capable of performing the same operation as that of a smart car even in a typical automobile in the related art.

The foregoing present invention may be implemented as codes readable by a computer on a medium written by the program. The computer-readable media may include all kinds of recording devices in which data readable by a computer system is stored. Examples of the computer-readable media may include hard disk drive (HDD), silicon disk drive (SDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
   an output unit;
   a wireless communication unit configured to receive at least one of object information associated with an object located adjacent to a vehicle and driving information associated with the driving of the vehicle from one or more external devices; and
   a controller configured to:
   detect a collision possibility between the object and the vehicle based on the driving information and the object information, and
   control the output unit to output notification information regarding the collision possibility in response to the collision possibility being detected between the vehicle and the object,
   wherein the output unit is configured to output the notification information in at least one manner of a visual, auditory and tactile manner, and
   wherein the controller is further configured to change the output of the notification information from any one of the visual, auditory and tactile manner to another one thereof according to a degree of the collision possibility.

2. The mobile terminal of claim 1, wherein the output unit comprises a display unit configured to display route guidance information; and
wherein the controller is further configured to display the notification information superimposed on the route guidance information in response to the collision possibility being detected.

3. The mobile terminal of claim 2, wherein the notification information comprises avoidance information on avoiding the collision with the object.

4. The mobile terminal of claim 3, wherein the controller is further configured to:
display an enlarged portion of the route guidance information, wherein the enlarged portion corresponds to a location of the object, and
display the avoidance information superimposed on the enlarged portion of route guidance information.

5. The mobile terminal of claim 3, wherein the avoidance information includes recommended location information for moving the vehicle to avoid a collision between the vehicle and the object.

6. The mobile terminal of claim 5, wherein the controller is further configured to transmit the recommended location information to the vehicle to be used in the vehicle through the wireless communication unit.

7. The mobile terminal of claim 1, wherein the controller is further configured to transmit the notification information to the vehicle through the wireless communication unit.

8. A driving assistance apparatus, comprising:
a light output unit mounted on a vehicle and configured to output light;
a sensing unit configured to sense a condition associated with an object located adjacent to the vehicle;
a wireless communication unit configured to receive driving information associated with the driving of the vehicle from the vehicle; and
a controller configured to:
detect a collision possibility between the object and the vehicle based on object information associated with the object and the driving information, and
control the light output unit to output light in response to the collision possibility being detected between the vehicle and the object, wherein the light output unit is configured to change an output direction of the light, and
wherein the controller is further configured to control the output direction of the light based on a shape of a road in response to the collision possibility being detected.

9. The driving assistance apparatus of claim 8, wherein the controller is further configured to:
control the light output unit to output light toward a first direction when a curvature of the road is a first curvature, and
control the light output unit to output light toward a second direction when the curvature of the road is a second curvature different from the first curvature.

10. The driving assistance apparatus of claim 8, wherein in response to the collision possibility being detected, the controller is further configured to:
calculate a cause point of the collision possibility based on the movement information of the vehicle, and
control the light output unit to irradiate the light to the cause point of the collision possibility.

11. The driving assistance apparatus of claim 10, further comprising:
a coloring unit configured to coat paint on a road to form a solid layer,
wherein the controller is further configured to control the coloring unit to coat the paint on the cause point of the collision possibility.

12. The driving assistance apparatus of claim 11, wherein the controller is further configured to control the coloring unit to coat a different color of paint based on the driving information.

13. The driving assistance apparatus of claim 8, further comprising:
a camera unit mounted on the vehicle and configured to capture video of a surrounding area of the vehicle,
wherein in response to the collision possibility, the controller is further configured to:
detect the location of at least one nearby object from the video of the surrounding area of the vehicle, and
set an output path of light to irradiate the light to the detected at least one nearby object.

14. The driving assistance apparatus of claim 13, wherein the controller is further configured to irradiate light to the detected at least one nearby object in response to a vehicle not being located within a preset range or a curvature of a road is above a preset curvature.

15. A vehicle, comprising:
an output unit;
a wireless communication unit configured to receive at least one of object information associated with an object located adjacent to the vehicle and driving information associated with the driving of the vehicle from one or more external devices; and
a controller configured to:
detect a collision possibility between the object and the vehicle based on the driving information and the object information, and
control the output unit to output notification information regarding the collision possibility in response to the collision possibility being detected between the vehicle and the object,
wherein the output unit is configured to output the notification information in at least one manner of a visual, auditory and tactile manner, and
wherein the controller is further configured to change the output of the notification information from any one of the visual, auditory and tactile manner to another one thereof according to a degree of the collision possibility.

* * * * *